(12) United States Patent
Lewit et al.

(10) Patent No.: US 12,129,611 B2
(45) Date of Patent: *Oct. 29, 2024

(54) COMPOSITE STRUCTURAL PANEL AND METHOD OF FABRICATION

(71) Applicant: COMPOSITES INTELLECTUAL HOLDINGS, INC., Melbourne, FL (US)

(72) Inventors: Scott Lewit, Melbourne, FL (US); Ronnal P. Reichard, Melbourne, FL (US)

(73) Assignee: COMPOSITES INTELLECTUAL HOLDINGS, INC., Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,403

(22) Filed: Apr. 3, 2023

(65) Prior Publication Data

US 2023/0279624 A1 Sep. 7, 2023

Related U.S. Application Data

(63) Continuation of application No. 17/135,853, filed on Dec. 28, 2020, now Pat. No. 11,619,014, which is a (Continued)

(51) Int. Cl.
*E01D 19/12* (2006.01)
*B29C 44/12* (2006.01)
(Continued)

(52) U.S. Cl.
CPC ........ *E01D 19/125* (2013.01); *B29C 44/1261* (2013.01); *B29C 44/1285* (2013.01);
(Continued)

(58) Field of Classification Search
CPC .. B32B 3/26; B32B 3/28; B32B 5/022; B32B 5/024; B32B 5/18; B32B 5/245;
(Continued)

(56) References Cited

U.S. PATENT DOCUMENTS 4,409,274 A * 10/1983 Chaplin ................ B32B 29/08
428/184
6,197,402 B1 * 3/2001 Miller ................ B31D 3/0207
428/116

(Continued)

*Primary Examiner* — Raymond W Addie
(74) *Attorney, Agent, or Firm* — Lowndes; Stephen C. Thomas; R. Richard Fredeking

(57) ABSTRACT

A composite structural panel for use in bridge structures, and method of manufacturing same, comprises a top panel and a bottom panel separated by and attached to at least one, but preferably a plurality, of structural composite preforms which may be fabricated by a continuous manufacturing process and may be saturated by resin using a continuous wetting process. The composite preforms may take any cross-sectional shape but are preferably trapezoidal. The top and bottom panels may be fabricated from a plurality of layers of woven fabric layers and non-woven fabric layers which are saturated with a resin that is subsequently cured using cure processes known in the art. The composite structural panel of the invention is usable as a flat structural member for use as bridge decking, ramps, trestles, and any application requiring a structural panel.

18 Claims, 15 Drawing Sheets

Related U.S. Application Data continuation of application No. 16/896,197, filed on Jun. 8, 2020, now Pat. No. 10,876,262, which is a continuation of application No. 16/216,509, filed on Dec. 11, 2018, now Pat. No. 10,676,883, which is a continuation of application No. 16/189,026, filed on Nov. 13, 2018, now Pat. No. 10,465,348, which is a continuation of application No. 15/516,409, filed as application No. PCT/US2015/053885 on Oct. 2, 2015, now Pat. No. 10,151,072, said application No. 16/216,509 is a continuation of application No. 15/516,409, filed as application No. PCT/US2015/053885 on Oct. 2, 2015, now Pat. No. 10,151,072.

(60) Provisional application No. 62/059,143, filed on Oct. 2, 2014.

(51) Int. Cl.
| | |
|---|---|
| *B29C 70/08* | (2006.01) |
| *B29C 70/48* | (2006.01) |
| *B32B 3/28* | (2006.01) |
| *B32B 5/02* | (2006.01) |
| *B32B 5/18* | (2006.01) |
| *B32B 5/24* | (2006.01) |
| *B32B 5/26* | (2006.01) |
| *B32B 7/05* | (2019.01) |
| *B32B 7/12* | (2006.01) |
| *E04C 2/34* | (2006.01) |
| *B32B 3/26* | (2006.01) |
| *E01D 101/40* | (2006.01) |

(52) U.S. Cl.
CPC ............ *B29C 70/086* (2013.01); *B29C 70/48* (2013.01); *B32B 3/28* (2013.01); *B32B 5/022* (2013.01); *B32B 5/024* (2013.01); *B32B 5/18* (2013.01); *B32B 5/245* (2013.01); *B32B 5/26* (2013.01); *B32B 7/05* (2019.01); *B32B 7/12* (2013.01); *E04C 2/3405* (2013.01); *B32B 3/26* (2013.01); *B32B 2260/021* (2013.01); *B32B 2260/046* (2013.01); *B32B 2262/0253* (2013.01); *B32B 2262/0276* (2013.01); *B32B 2262/101* (2013.01); *B32B 2262/106* (2013.01); *B32B 2305/022* (2013.01); *B32B 2305/188* (2013.01); *B32B 2307/554* (2013.01); *B32B 2307/732* (2013.01); *B32B 2471/00* (2013.01); *E01D 19/12* (2013.01); *E01D 2101/40* (2013.01); *E04C 2002/3455* (2013.01); *E04C 2002/3472* (2013.01)

(58) Field of Classification Search
CPC .... B32B 5/26; B32B 7/05; B32B 7/12; B32B 2260/021; B32B 2260/046; B32B 2260/0253; B32B 2260/0276; B32B 2260/101; B32B 2260/106; B32B 2305/022; B32B 2305/188; B32B 2307/554; B32B 2307/732; B32B 2471/00; E01D 19/12; E01D 19/125; E01D 2101/40; E04C 2002/3455; E04C 2002/3472

USPC ................ 404/17, 28, 31, 34–36; 14/73
See application file for complete search history.

(56) References Cited

U.S. PATENT DOCUMENTS

| | | | | |
|---|---|---|---|---|
| 6,467,118 | B2 * | 10/2002 | Dumlao | E04D 13/1656 52/783.17 |
| 2008/0078038 | A1 * | 4/2008 | Borazghi | E01D 19/125 14/73 |
| 2010/0186345 | A1 * | 7/2010 | Hughes, Jr. | E04C 2/22 52/783.17 |

* cited by examiner

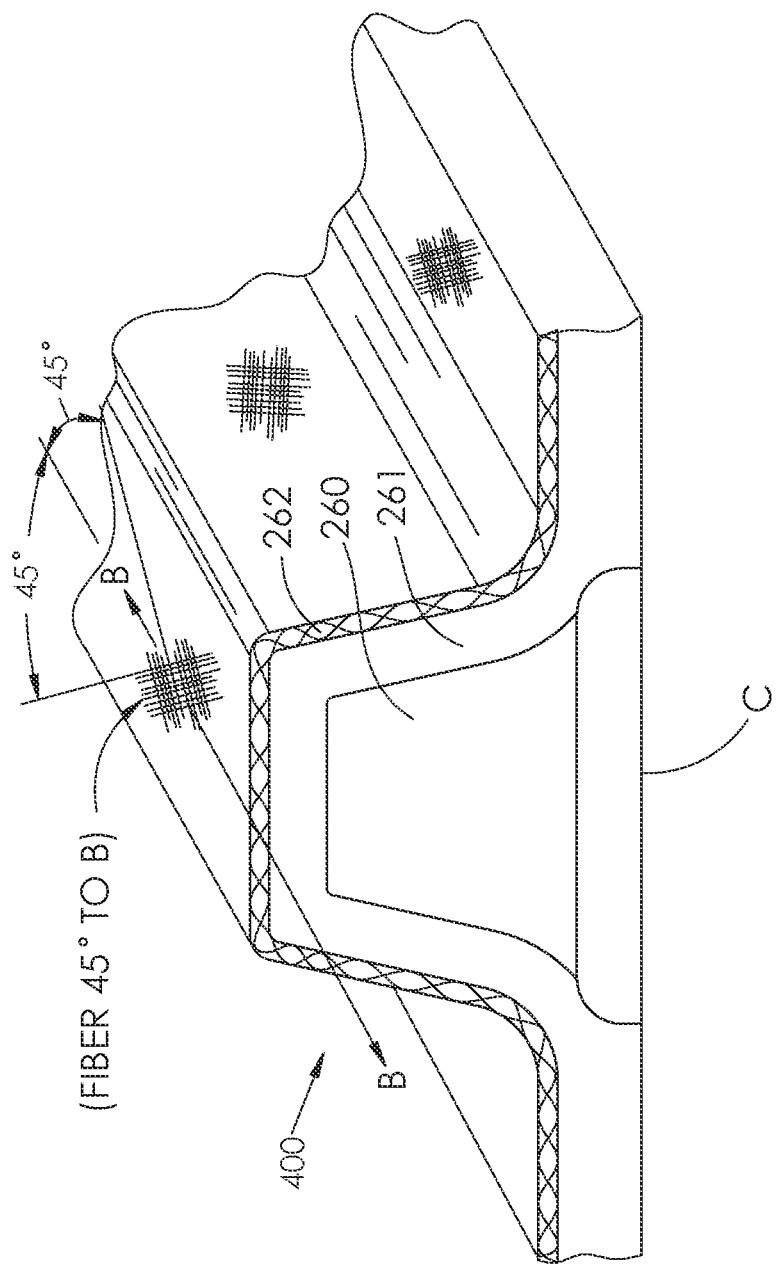

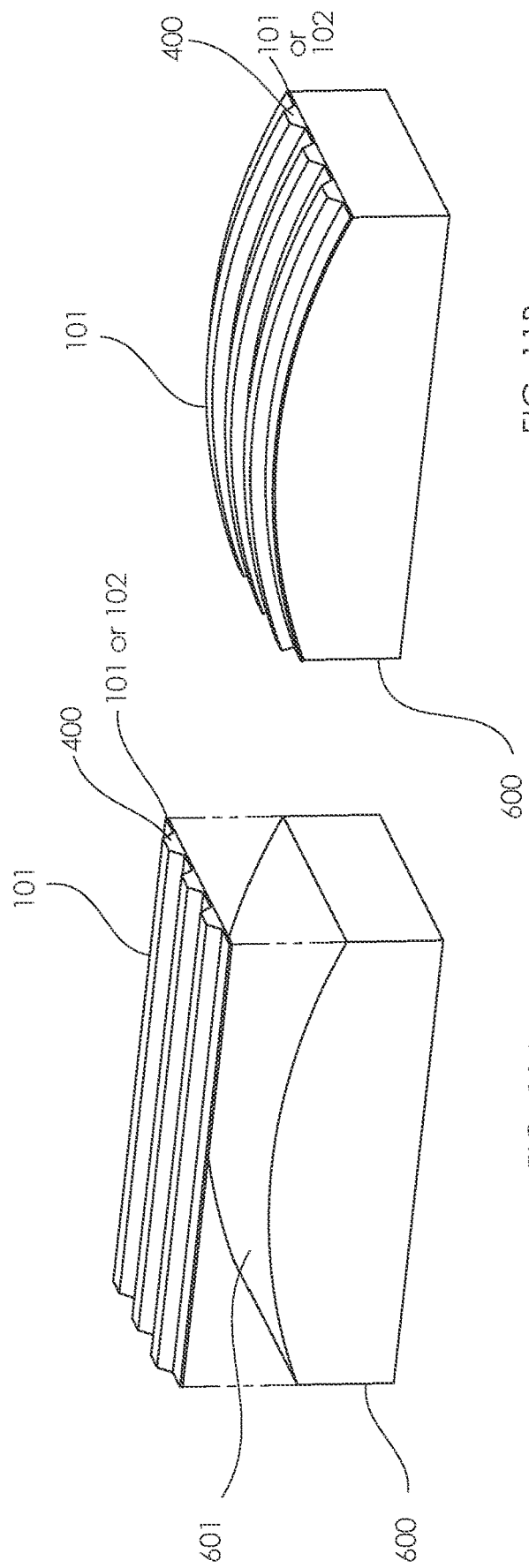

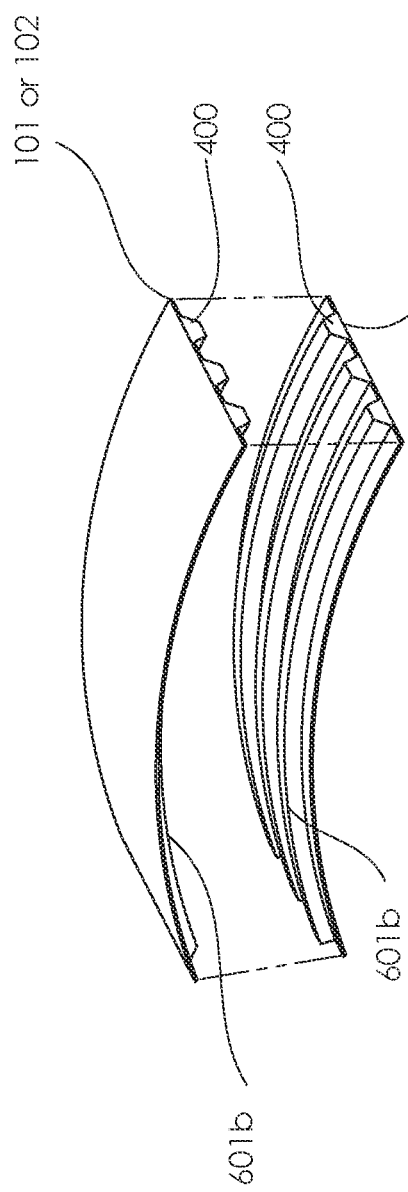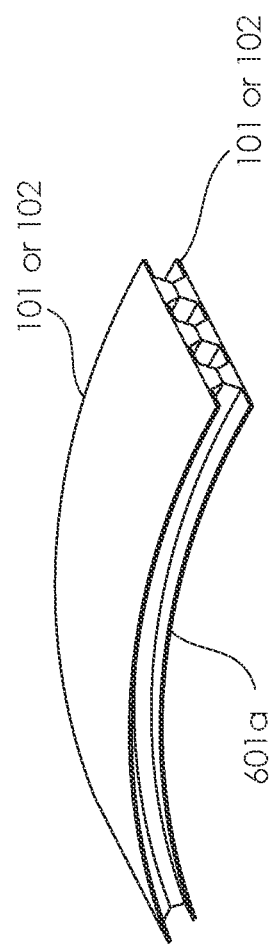
FIG. 12A
FIG. 12B

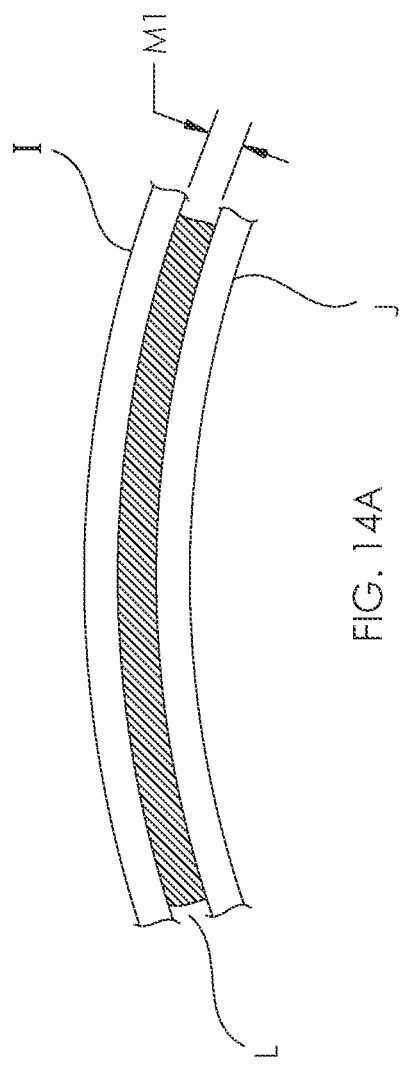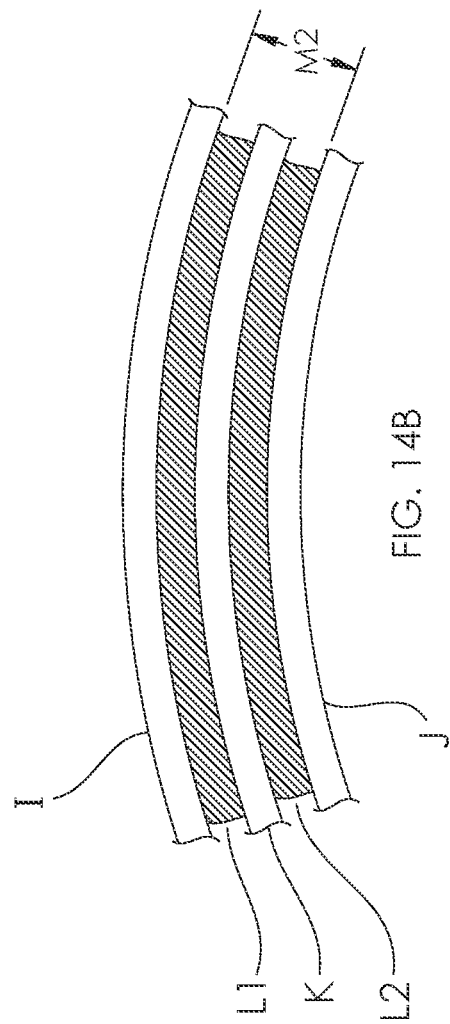

COMPOSITE STRUCTURAL PANEL AND METHOD OF FABRICATION

CROSS REFERENCE TO RELATED APPLICATIONS

This application is a non-provisional application for patent filed in the United States Patent and Trademark Office (USPTO), and is a continuation of U.S. patent application Ser. No. 17/135,853 entitled "COMPOSITE STRUCTURAL PANEL AND METHOD OF FABRICATION" which was filed in the USPTO on Dec. 28, 2020, which issued from the USPTO on Apr. 4, 2023 as U.S. Pat. No. 11,619,014, which is incorporated herein by reference in its entirety; U.S. patent application Ser. No. 17/135,853 is a continuation of U.S. patent application Ser. No. 16/896,197 entitled "COMPOSITE BRIDGE DECK STRUCTURAL PANEL AND METHOD OF FABRICATION", filed in the USPTO on Jun. 8, 2020, which issued as U.S. Pat. No. 10,876,262 on Dec. 29, 2020, which is incorporated by reference herein in its entirety; U.S. patent application Ser. No. 16/896,197 is a continuation of U.S. patent application Ser. No. 16/216,509 entitled "COMPOSITE BRIDGE DECK STRUCTURAL PANEL AND METHOD OF FABRICATION", filed in the USPTO on Dec. 11, 2018, which issued from the USPTO on Jun. 9, 2020 as U.S. Pat. No. 10,676,883, which is incorporated by reference herein in its entirety; U.S. patent application Ser. No. 16/216,509 is a continuation of U.S. patent application Ser. No. 15/516,409 entitled "COMPOSITE STRUCTURAL PANEL AND METHOD OF FABRICATION", filed in the USPTO on Apr. 2, 2017, which issued from the USPTO on Dec. 11, 2018 as U.S. Pat. No. 10,151,072, which is incorporated by reference herein in its entirety; U.S. patent application Ser. No. 15/516,409 is a 371 national stage entry of PCT application serial number PCT/US2015/53885 entitled "COMPOSITE STRUCTURAL PANEL AND METHOD OF FABRICATION", filed in the United States Receiving Office (USRO) under the Patent Cooperation Treaty on Oct. 2, 2015, which published as WO/2016/054607 on Apr. 7, 2016, which is incorporated by reference herein in its entirety; PCT application serial number PCT/US2015/53885 claimed the benefit of United States provisional application for patent Ser. No. 62/059,143 entitled "COMPOSITE STRUCTURAL PANEL AND METHOD OF FABRICATION", filed in the USPTO under 35 U.S.C. § 111(b) on Oct. 2, 2014, which is incorporated by reference herein in its entirety; U.S. application Ser. No. 16/216,509 is also a continuation of U.S. patent application Ser. No. 16/189,026 entitled "COMPOSITE STRUCTURAL PANEL AND METHOD OF FABRICATION", filed in the USPTO on Nov. 13, 2018, which issued as U.S. Pat. No. 10,465,348 on Nov. 5, 2019, which is incorporated by reference herein in its entirety and which is a continuation of U.S. patent application Ser. No. 15/516,409 entitled "COMPOSITE STRUCTURAL PANEL AND METHOD OF FABRICATION", filed in the USPTO on Apr. 2, 2017, which issued from the USPTO on Dec. 11, 2018 as U.S. Pat. No. 10,151,072, which is incorporated by reference herein in its entirety, which is a 371 national stage entry of application serial number PCT/US2015/53885 entitled "COMPOSITE STRUCTURAL PANEL AND METHOD OF FABRICATION" filed in the United States Receiving Office (USRO) under the Patent Cooperation Treaty on Oct. 2, 2015, which published as WO/2016/054607 on Apr. 7, 2016, which is incorporated by reference herein in its entirety, which claimed the benefit of United States provisional application for patent Ser. No. 62/059,143 entitled "COMPOSITE STRUCTURAL PANEL AND METHOD OF FABRICATION" filed in the USPTO under 35 U.S.C. § 111(b) on Oct. 2, 2014, which is also incorporated by reference herein in its entirety. All of the foregoing patents, patent applications, and patent application publications are incorporated herein by reference in their entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

INCORPORATION-BY-REFERENCE OF MATERIAL FROM PUBLISHED PATENT APPLICATIONS AND ISSUED PATENTS

United States Patent Application Publication No. US20140262011A1, published on Sep. 18, 2014 is hereby incorporated by reference in its entirety.

The disclosures of U.S. Pat. No. 6,013,213, issued Jan. 11, 2000; U.S. Pat. No. 6,004,492 issued Dec. 21, 1999, U.S. Pat. No. 5,897,818 issued Apr. 27, 1999; U.S. Pat. No. 5,908,591 issued Jun. 1, 1999; U.S. Pat. No. 5,429,066 issued Jul. 4, 1995; U.S. Pat. No. 5,800,749 issued Sep. 1, 1998; U.S. Pat. No. 6,206,669 issued Mar. 27 2001; U.S. Pat. No. 5,664,518 issued Sep. 9, 1997; U.S. Pat. No. 6,543,469 issued Apr. 3, 2003; U.S. Pat. No. 6,497,190 issued Dec. 24, 2002; and U.S. Pat. No. 6,911,252 issued Jun. 28, 2005 are also incorporated herein by reference in their entirety.

The disclosure of United States Patent Application Publication No. US20140199551, CO-CURED GEL COATS, ELASTOMERIC COATINGS, STRUCTURAL LAYERS, AND IN-MOLD PROCESSES FOR THEIR USE, filed in the USPTO on Jan. 16, 2013 and published by the USPTO on Jul. 17, 2014, is also hereby incorporated by reference in its entirety.

BACKGROUND OF THE INVENTION

Field of the Invention

The field of the invention relates generally to the field of composite structures used for bridges and other engineered structures which are intended for use in roadways, bridges, and other structures generally. More specifically, the invention relates to a composite structure for use in engineered structures such as, for example but not limited to, bridge and other roadway decking and support structures, ramps, dock decking and support structures, vehicle chassis and structures, trailer chassis and structures, and virtually any application which requires structural components; and an efficient method of fabricating same.

Background Art

The background art of engineered structures for structural panels used, for example, in bridges; bridge roadway decking; general roadway structures; commercial construction such as floors, walls, and roofs; and other structures typically relies upon concrete or cement fabrication techniques, including pre-stressed cement structures, tilt wall, pouredin-place, pre-fabricated or other similar concrete or cement structures. Such cement or concrete structures may be pre-fabricated and shipped to the construction site or may be formed and poured in situ.

However the cement and/or concrete structures of the prior art do not easily or economically lend themselves to methods for rapid manufacturing, nor are they easily inspected for manufacturing flaws or defects during fabrication. For example, a bridge structure may, over time, develop localized points of failure within the structure that are not visible for visual inspection, leading to failure propagation and eventual unexpected catastrophic failure of the structure. Such structures may contain undetectable flaws which may lay in a latent condition for a period of years without discovery, causing severe damage or injury when they are finally subjected to a load of enough magnitude to cause failure—which can occur, for example, during a temperature extreme condition such as extreme cold, while supporting a high traffic load.

Furthermore, such structures, when pre-fabricated, are of such weight and volume that transport costs can be extremely high.

What is needed in the art, therefore, is an economically and easily fabricated structure for use in applications such as, for example, bridge decking, which may be inspected at various stages of fabrication to identify flaws and defects before such structures are assembled into use, and which lends itself to efficient, repeatable production procedures and techniques.

BRIEF SUMMARY OF THE INVENTION

The present invention comprises an apparatus and method that have one or more of the following features and/or steps, which alone or in any combination may comprise patentable subject matter.

The present invention overcomes the shortcomings of the prior art in that it provides an economical, inspectable and efficient process for fabricating bridge and other roadway decking and support structures, ramps, dock decking and support structures, vehicle chassis and structures, trailer chassis and structures, and virtually any application which requires structural components; and an efficient method of fabricating same.

In accordance with one embodiment of the present invention, the invention comprises a novel structure which may be used in any structural application, for example, as bridge decking structure for use in bridges generally used for vehicle traffic; ramps for vehicles; or any application requiring a structural panel. The invention comprises a structural panel top half and a structural panel bottom half that may each be independently fabricated and then assembled and attached together by, for example, adhesives and chemical bonding of any means known in the art, to form a unitary structural panel. The composite preforms of the invention may be fabricated from foam surrounded by fiber cloth, which may be fiberglass, carbon fiber or any other type of fiber cloth known in the art of structural composites, which is then impregnated with a resin. The structural panel top half may comprise a plurality of composite preforms in any cross-sectional shape, but which may be, preferably, a trapezoidal cross-section, which preforms may be, but are not necessarily, disposed in parallel fashion and may be but are not necessarily equally spaced from one another, on a surface of and attached to a top plate comprised preferentially, but not necessarily, of multiple layers of fiberglass fabric material impregnated with a resin. The structural panel bottom half may comprise a plurality of composite preforms in any cross-sectional shape, but which may be, preferably, a trapezoidal cross-section, which preforms may be, but are not necessarily, disposed in parallel fashion and may be but are not necessarily equally spaced from one another, on and attached to a surface of a bottom plate comprised preferentially, but not necessarily, of multiple layers of fabric material impregnated with a resin.

The structural preforms of the invention may be fabricated by any of the methods for continuously manufacturing a composite described in any of U.S. Pat. No. 6,013,213, issued Jan. 11, 2000; U.S. Pat. No. 6,004,492 issued Dec. 21, 1999, U.S. Pat. No. 5,897,818 issued Apr. 27, 1999; U.S. Pat. No. 5,908,591 issued Jun. 1, 1999; U.S. Pat. No. 5,429,066 issued Jul. 4, 1995; U.S. Pat. No. 5,800,749 issued Sep. 1, 1998; U.S. Pat. No. 6,206,669 issued Mar. 27 2001; U.S. Pat. No. 5,664,518 issued Sep. 9, 1997; U.S. Pat. No. 6,543,469 issued Apr. 3, 2003; U.S. Pat. No. 6,497,190 issued Dec. 24, 2002; or 6,911,252 issued Jun. 28, 2005. For example, each of the composite preforms of the invention may be fabricated by the methods taught and disclosed in U.S. Pat. No. 5,908,591 which steps comprise arranging a fabric layer and a configuration constrained against outward and defining a cavity between two opposing surfaces of the fabric layer; dispensing a predetermined amount of self-expanding, self-curable uncured foam into the cavity, the foam expanding inhering in the cavity and a molding pressure determined by the predetermined amount of the foam and thereby attaching itself to the fabric layer to form the composite structure, the molding pressure causing the expanding foam to substantially fill only interstitial spaces of an inner portion of the fabric layer, without substantially penetrating an outer portion of the fabric layer; and, freeing the cured composite structure from the constraint of the arranging step, the outer portion of the fabric layer of the composite structure being thereafter substantially completely saturated with a curable resin. The composite preform is then ready for lamination to another structure in subsequent processing steps. The method may further comprise the step of attaching the cured composite preform to another composite structure, such as the top plate of the invention or the bottom plate of the invention, by bonding with adhesives or chemical bonding agents, by saturating the outer portion of the fabric layer of the cured composite structure with a curable resin and by applying a layer or layers of fabric over the composite preform and adjacent plate areas and also saturating the layer or layers with resin, or both.

The structural panel top half and structural panel bottom half may then be generally described as a plurality of structural preforms placed upon a top plate and bottom plate, respectfully, and arranged in a spacing as desired by the user which spacing may be, but is not necessarily, uniform, and in which the disposition of composite preforms may be generally parallel and evenly spaced. The cross-sectional shape of the composite preforms may be, in one embodiment, trapezoidal as shown and disclosed in the figures of the drawings but it is understood that it is within the scope of the invention that any other cross-sectional shapes such as square, rectangular, triangular, polygon, or any other cross-sectional shape may comprise composite preforms of the invention. Referring now to the trapezoidal cross-sectional shape embodiment of the invention, structural panel top half and structural panel bottom half may comprise an alternating cross sectional pattern of foam and air filled trapezoids that are configured such that when the structural panel top half and structural panel bottom half are assembled together by, for instance, any structural adhesive known in the art, a unitary structure comprising alternating trapezoidal voids and trapezoidal solid shapes filled with foam is created as shown in the exemplary embodiment depicted in the figures of the drawings.

An embodiment of the structural composite panel may further be described as having a top plate defined as a planar structure and having an upper surface and an underneath surface, wherein the top plate is comprised of a plurality of fiber layers saturated with resin and subsequently cured; a bottom plate defined as a planar structure and having an upper surface and a lower surface wherein the bottom plate is comprised of a plurality of fiber layers saturated with resin and subsequently cured; a first set of at least one composite preforms having a foam core and covered in a fabric saturated with resin and subsequently cured; a second set of at least one composite preforms having a foam core and covered in a fabric saturated with resin and subsequently cured; wherein the first set of composite preforms are attached to the underneath surface of said top plate; and wherein the second set of composite preforms are attached to the upper surface of the bottom plate; and wherein the first set of composite preforms and the second set of composite preforms are attached together, forming a structural composite panel. The first and second set of composite preforms may be trapezoidal in cross section, and the attachment of the first set of composite preforms to the underneath surface of the top plate may occur at a large base of the preform trapezoids; and the second set of composite preforms attachment to the upper surface of the bottom plate may also occur at a large base of the trapezoids. The attachment of the first set of composite preforms and the second set of composite preforms may occur at the small bases of the trapezoids.

The structural panel top plate and structural panel bottom plate may be fabricated by hand lamination, infusion, resin transfer molding assembly techniques, or by any other means for creating a structural composite plate as is known in the art.

The foam filled composite preforms of the invention may be fabricated by hand lamination, infusion, resin transfer molding assembly techniques, by the methods for continuously manufacturing a composite preform as taught and disclosed in any of the following documents: U.S. Pat. No. 6,013,213, issued Jan. 11, 2000; U.S. Pat. No. 6,004,492 issued Dec. 21, 1999, U.S. Pat. No. 5,897,818 issued Apr. 27, 1999; U.S. Pat. No. 5,908,591 issued Jun. 1, 1999; U.S. Pat. No. 5,429,066 issued Jul. 4, 1995; U.S. Pat. No. 5,800,749 issued Sep. 1, 1998; U.S. Pat. No. 6,206,669 issued Mar. 27 2001; U.S. Pat. No. 5,664,518 issued Sep. 9, 1997; U.S. Pat. No. 6,543,469 issued Apr. 3, 2003; U.S. Pat. No. 6,497,190 issued Dec. 24, 2002; and U.S. Pat. No. 6,911,252 issued Jun. 28, 2005; or by any other technique known in the art for manufacturing composite structures.

Once fabricated, structural panel top half and structural panel bottom half may be bonded together to form a unitary completed structural composite structural panel comprising a top plate, a bottom plate, and a series of trapezoidally or otherwise-shaped voids and foam filled spaces covered by a fabric such as, for example fiberglass or carbon fiber, and saturated with a resin which is subsequently cured. Structural panel top plate may be bonded to the structural composite preforms, and structural panel bottom plate may be bonded to the structural composite preforms. The resulting structural panel comprises a top plate, a bottom plate, and alternating trapezoidal voids and foam filled open spaces created by the plurality of structural composite preforms. While it is within the scope of the invention that the structural composite preforms may be aligned in any orientation between the top and bottom plates, a preferred embodiment of the structural panel of the inventions intended for bridge decking applications comprises the structural composite preforms disposed in a transverse direction to the longitudinal axis of the bridge structure, which may be, for instance, the direction of travel of vehicles upon the bridge deck surface.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings:

FIG. 8 depicts a perspective cross section view of an exemplary composite preform of the invention, showing the foam core surrounded by non-woven fabric, which is in turn surrounded by a woven fabric having fibers oriented in a +45 degree and an −45 degree orientation related to a longitudinal axis of the composite preform.

FIGS. 11A and 11B depict a method and apparatus for forming a non-planar embodiment of the structural panels of the invention which may be utilized to form crowned roadways, curved walkway covers, or any curved structural panel.

FIGS. 12A and 12B depict the assembly of a non-planar panel embodiment of the invention which may be utilized to form crowned roadways, curved walkway covers, or any curved structural panel.

FIG. 14A depicts a layer stack up of the prior art in which fabric layers are overlapped and wetted with resin to form a structure. This figure is for the purpose of explaining some of the disadvantages of the method and apparatus of the prior art.

FIG. 14B depicts a layer stack up of the prior art in which fabric layers are overlapped and wetted with resin to form a structure. This figure is for the purpose of explaining some of the disadvantages of the method and apparatus of the prior art.

DETAILED DESCRIPTION OF THE INVENTION

The invention generally comprises a structural panel that comprises a plurality of composite preforms that are attached to a top plate and to a bottom plate to form a structural panel top half and a structural panel bottom half. The structural panel top half and structural panel bottom half may be attached together to form a completed structural panel. The invention further comprises a method of manufacturing the structural panel of the invention.

As used herein, the word "panel" or "structural panel" means a completed structural panel that may be utilized in any orientation, and for any application, as may be desired by the user. Thus, a completed structural panel of the invention may be used to provide decking for bridges, ramps, trestles, floors for buildings, or other horizontal, vertical or angled structures. In the exemplary application disclosed herein, one intended use of the structural panel of the invention is that of decking for bridges. However it is to be understood the bridge decking application is only one of many applications of the structural panel of the invention, and that the structural panels of the invention may be utilized in any number of applications and made be disposed in any orientation as may be desired by a user to suit a particular purpose. Thus, for instance, the structural panels of the invention may be utilized to provide a vertical structure, horizontal structure, a structure that is oriented at any angle, and which may be used for any purpose.

Figure 1:
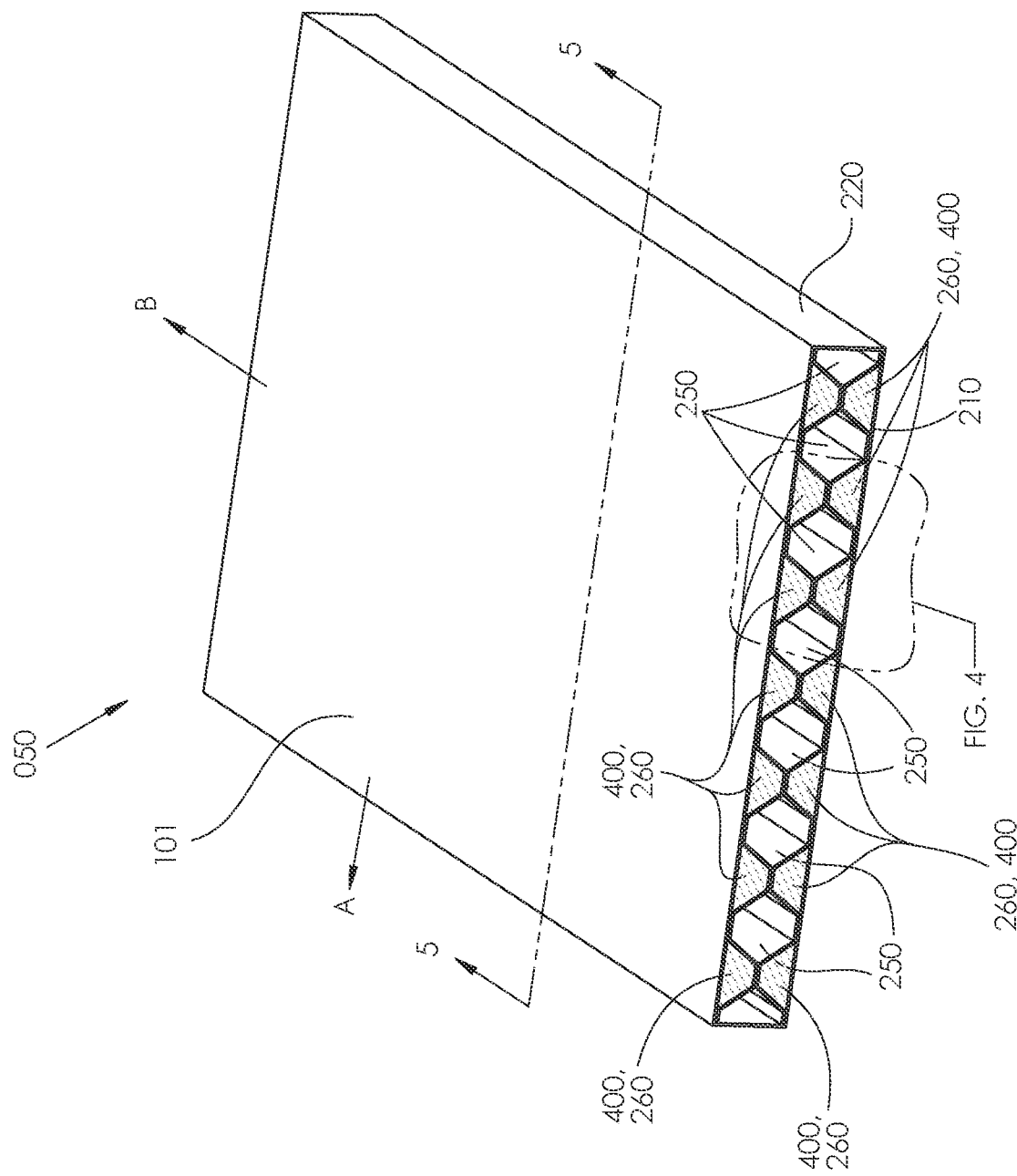
FIG. 1 depicts an assembled perspective view of a preferred embodiment of a structural panel of the invention in which the top half and bottom half have been structurally bonded together forming a unitary structure comprising alternating trapezoidally shaped voids and foam filled spaces, in which the foam filled spaces comprise composite preforms covered in fabric and saturated in resin which is subsequently cured.

Referring now to FIG. 1, a perspective view of a structural panel of the invention is depicted. Top plate 101 forms an upper surface of structural panel 050 of the invention. Open spaces 250 may be filled with air and may run in the direction of arrow B through structural panel 050. Structural panel bottom half side plates 220 may optionally form both sides of structural panel 050. Side plates 220 are optional: the structural panel of the invention may or may not comprise side plates 220. Side plates 220 may be of a height that is substantially equal to the thickness of the combination of the top plate, the composite preforms 400 attached to the top plate 101, the bottom plate 210, and the composite preforms 400 attached to said bottom plate. Foam 260 may fill the composite preform interior space as indicated in the figure and as further described below in the description of manufacturing composite preforms 400. Structural panel bottom plate 210 forms a bottom surface of structural panel 050. Cabling, piping, conduit, and the like may traverse the structure through open spaces 250 as desired by the user. Furthermore, open spaces 250 may be used for optical and other inspection after manufacturing or after installation of the structural panels of the invention. This ability to inspect the interior of the installed structural panel of the invention is a significant advancement in the state of the art, as it is generally impossible to inspect the interior of the typical structural panels of the prior art, which may be fabricated, for example, from cement. Direction A is shown for reference to the other figures.

Figure 2:
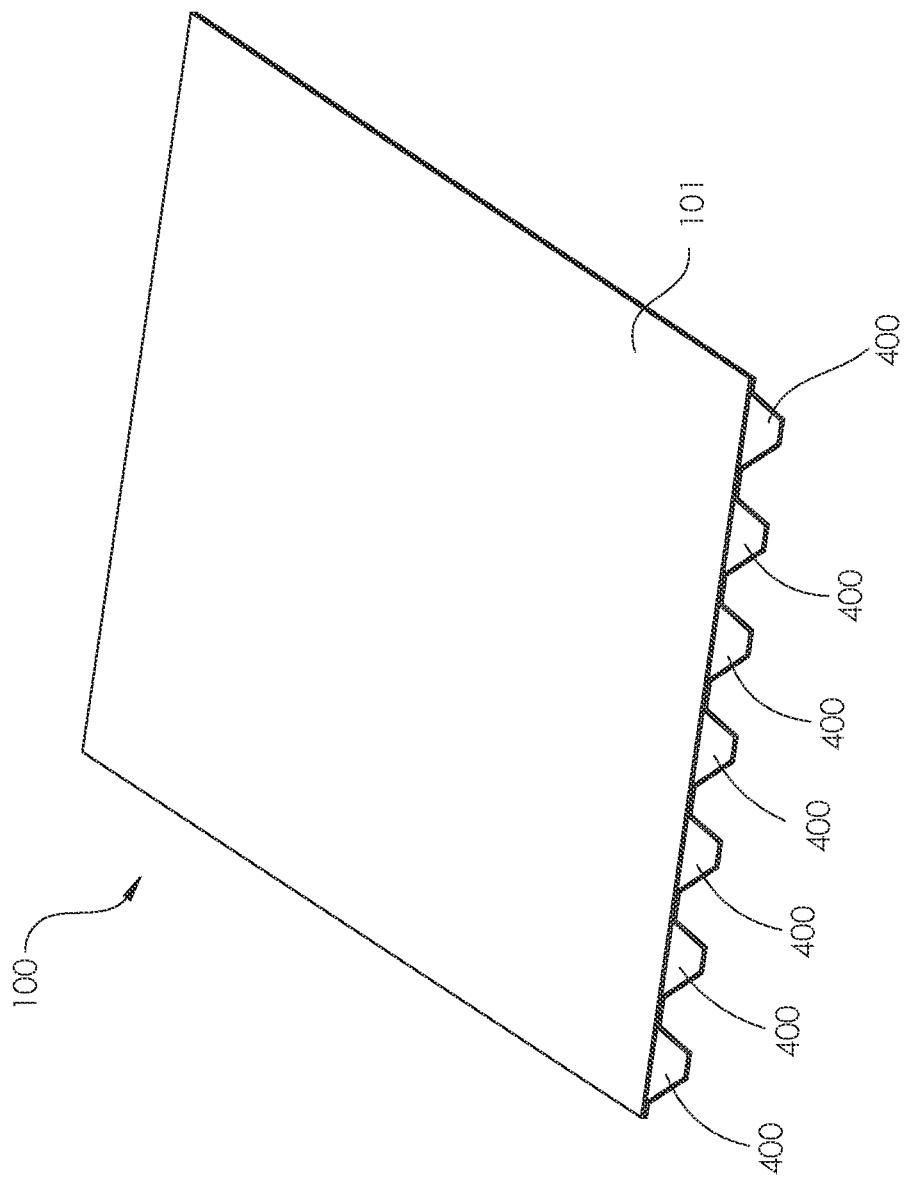
FIG. 2 depicts a perspective view of the top half of the invention in which structural composite preforms, which are covered in fabric and saturated resin which is subsequently cured, are disposed in parallel fashion upon a bottom surface of the top plate of the invention and bonded thereto by any structural adhesive or chemical bonding known in the art.

Referring now to FIG. 2, a perspective view of structural panel top half 100 is depicted. In the exemplary embodiment shown, seven composite preforms 400 are chemically bonded to a bottom surface of structural panel top plate 101 to form structural panel top half 100. It is to be understood that although seven composite preforms 400 are depicted in the figure, any number of composite preforms may comprise the invention. So, for example, the invention may comprise any number of composite preforms ranging from one to twenty or more. The number of composite preforms, and the size of composite preforms 400, are determined by the user of the system based upon the structural loads anticipated to be applied to the structural panel of the invention in any particular application, such as bridge decking, ramp decking, and the like. Typically, the structural panel of the invention will comprise a plurality of composite preforms 400 and, typically, the composite preforms 400 of the invention will be spaced equidistant from one another and will run parallel to one another as depicted in the various figures of the drawings. However, it is to be understood that any number, size, spacing between, and orientation or disposition of the preforms may be utilized in the invention and therefore the invention is not to be limited by the particular embodiment depicted in the figures regarding same. Preform foam core 260 is shown for reference.

Figure 3:
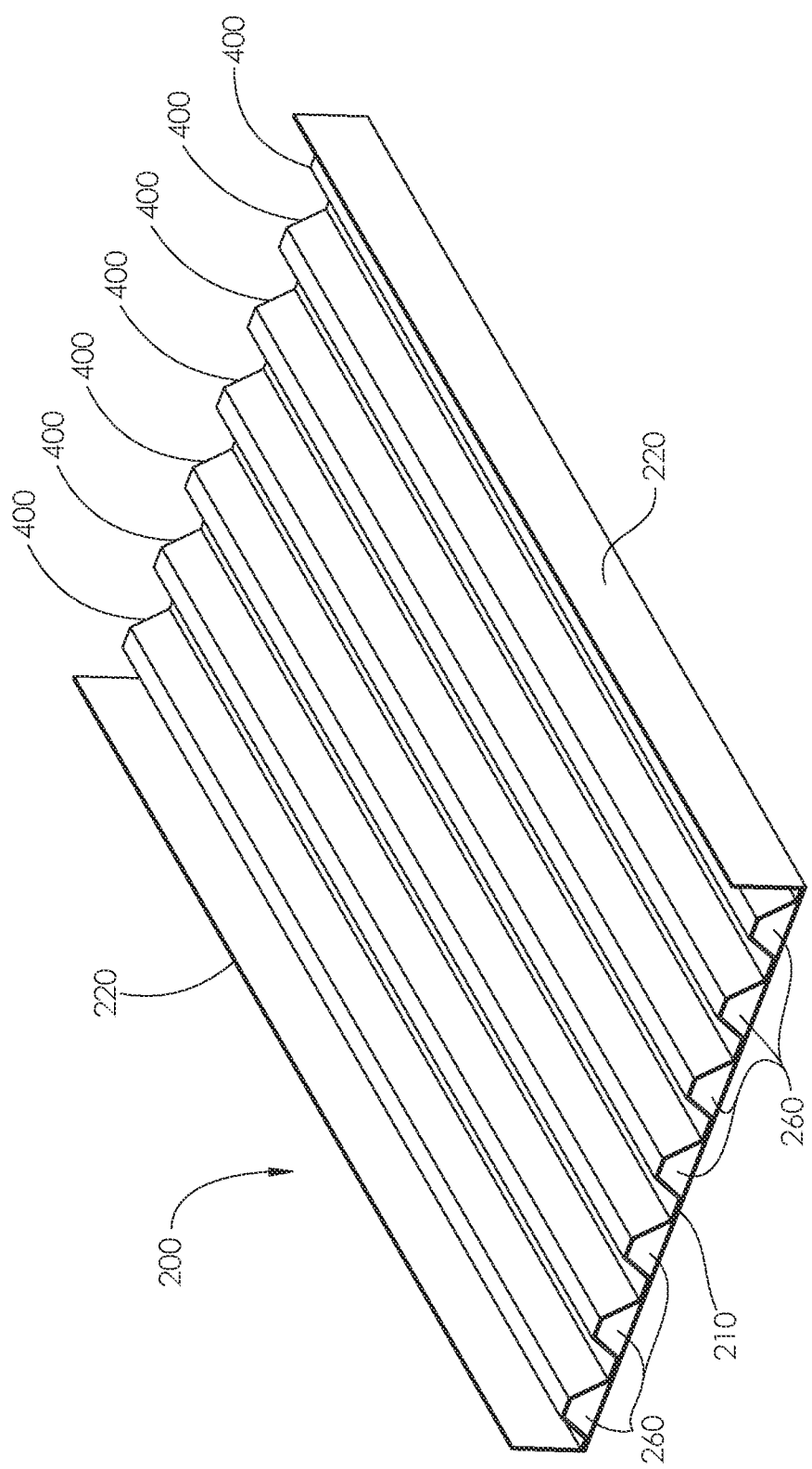
FIG. 3 depicts a perspective view of the bottom half of the invention in which structural composite preforms, which are covered in fabric and saturated in resin which is subsequently cured, are disposed in parallel fashion upon a top surface of the bottom plate of the invention and bonded thereto by any structural adhesive for chemical bonding known in the art.

Referring now to FIG. 3, a perspective view of structural panel bottom half 200 is depicted. In the particular embodiment depicted in FIG. 3, seven composite preforms 400 are bonded to an upper surface of structural panel bottom plate 210. Bottom half side plates 220 may optionally form sides of structural panel bottom half 200. It is to be understood that although seven composite preforms 400 are depicted in the figure, any number of composite preforms 400 may comprise the invention. The number of composite preforms 400, and the size of composite preforms 400, are determined by the user of the system based upon the structural loads anticipated to be applied to the structural panel of the invention in any particular application, such as bridge decking, ramp decking, and the like. Thus the structural panel of the invention may comprise any number or size of preforms. Typically, the structural panel of the invention will comprise a plurality of composite preforms 400 and, typically, the composite preforms 400 of the invention will be spaced equidistant from one another and will run parallel as depicted in the various figures of the drawings. However, it is to be understood that any number, size, spacing between, and orientation or disposition of the preforms may be utilized in the invention and therefore the invention is not to be limited by the particular embodiment depicted in the figures regarding same.

It is generally desirable, but not necessary, that structural panel top half 100 and structural panel bottom half 200 comprise the same number of composite preforms 400.

Figure 4:
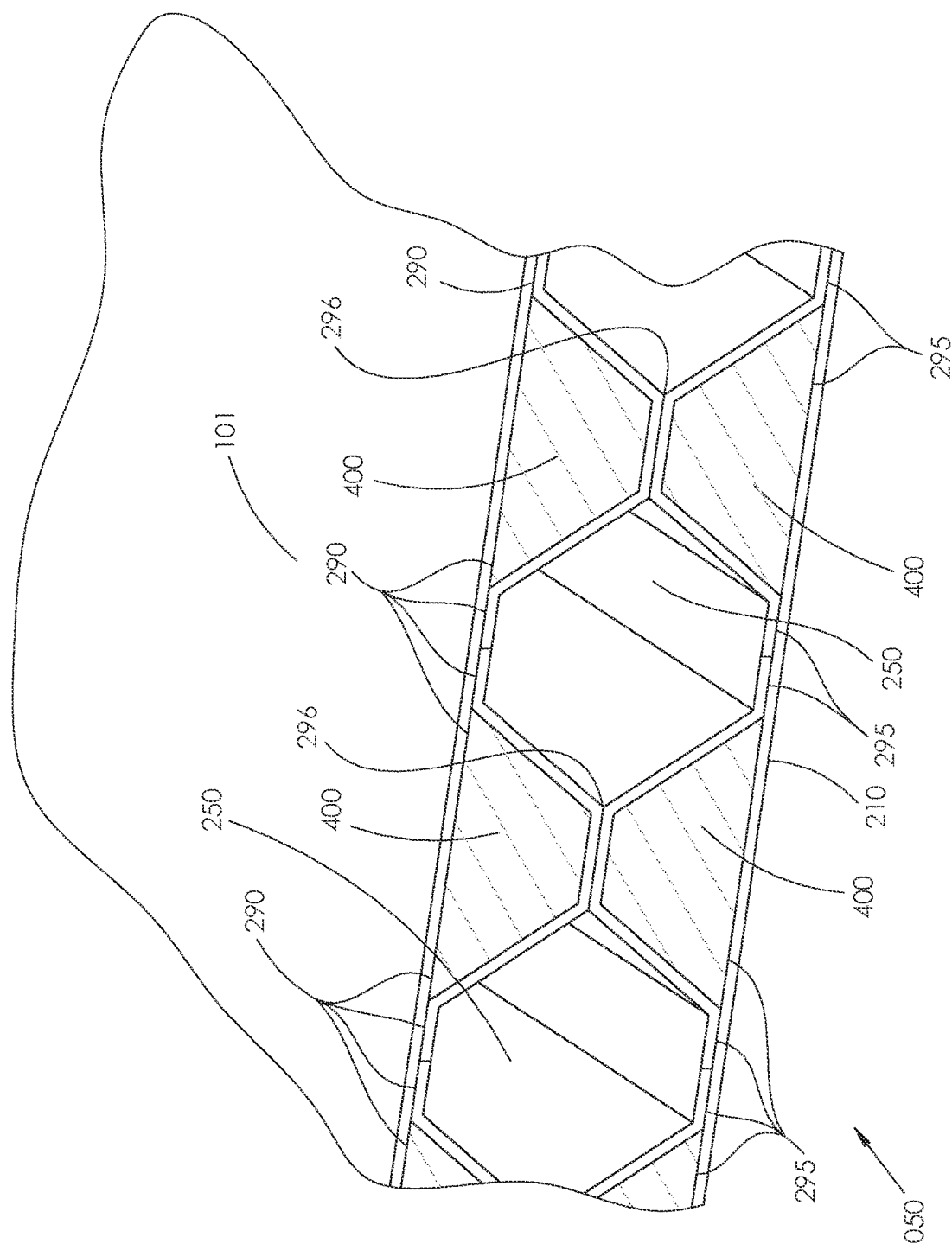
FIG. 4 depicts an expanded view of the assembled structural panel embodiment of the invention, more closely showing the structural bonding between composite preforms and between the composite preforms and the bottom surface of the top plate and top surface of the bottom plate of the invention.

Referring now to FIG. 4, an expanded perspective view of an end portion of the structural panel of the invention 050 is depicted. Structural panel top plate 101 may be bonded on its underneath side to composite preforms 400 in areas 290 which form a composite preform-to-top-plate bond. Any chemical adhesive or bonding agent may be utilized to bond structural panel top plate 101 to composite preforms 400 in the areas designated 290. Structural panel bottom plate 210 may be bonded on its upper surface to composite preforms 400 in areas 295 which form a composite preform-to-bottom plate bond. Any chemical adhesive or bonding agent may be utilized to bond structural panel bottom plate 210 to composite preforms 400 in the areas designated 295. The composite preforms 400 that are bonded to the top plate 101 may be bonded to the composite preforms 400 that are bonded to bottom plate 210 at the areas designated as 296. The structural panel of the invention 050 thus comprises open spaces 250, which are channels that allow for insertion of optical and other inspection probes or equipment of an assembled structure. These open spaces 250 thus enable on-site inspection of structures, such as, by example, and not by way of limitation, insertion of fiber optic probes in order perform visual inspection. The ability to perform such inspection internal to the structural panel is a significant advantage of the structural panel of the invention.

Figure 5:
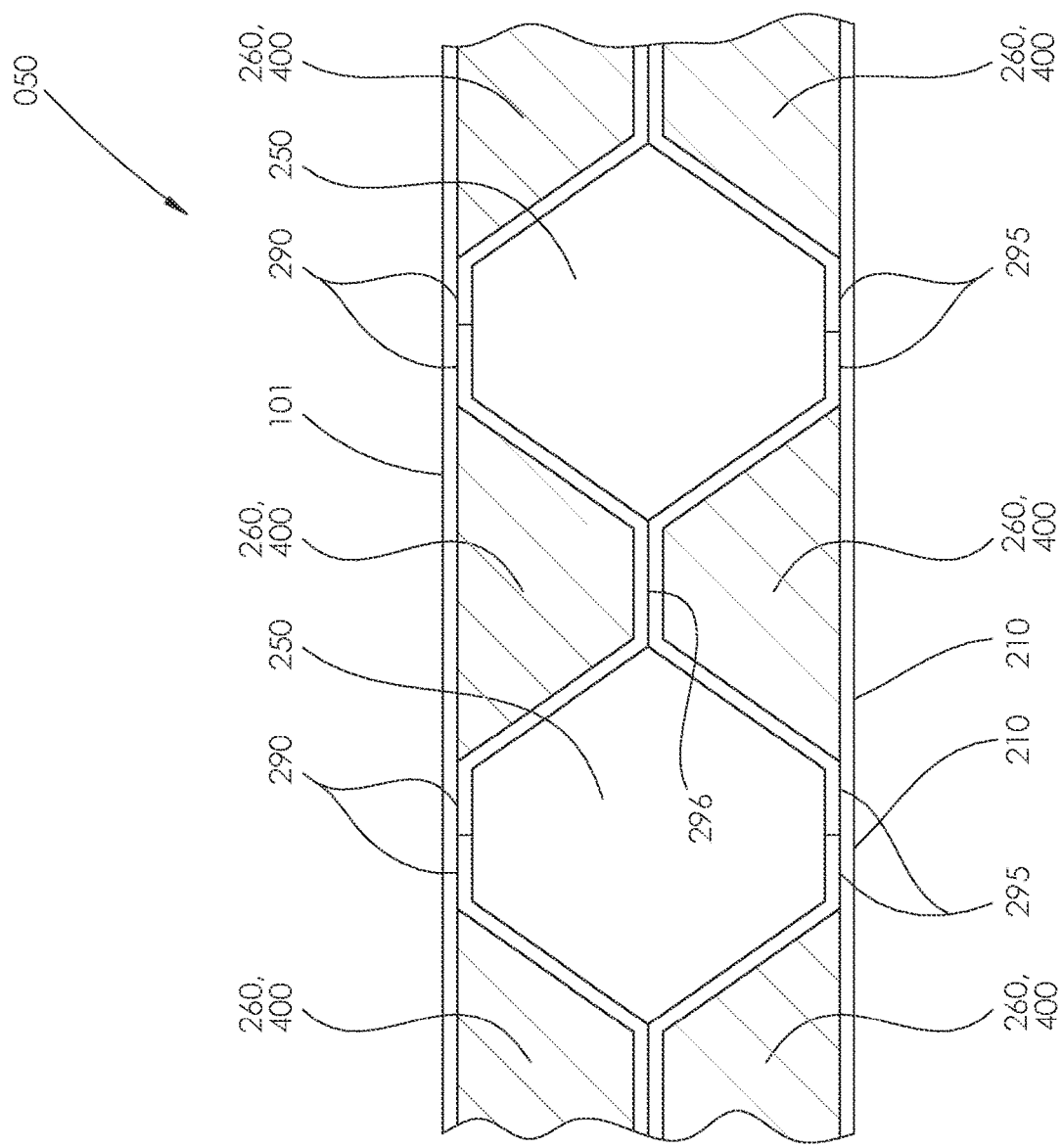
FIG. 5 depicts a cross-sectional view of the assembled structural panel of the invention, more closely showing the structural bonds between the composite preforms, and showing the bonds between the composite preforms and the bottom surface of the top plate and top surface of the bottom plate of the invention.

Referring now to FIG. 5, an orthogonal cross-section of the structural panel 050 of the invention is depicted. This view provides a cross-section view of the various bonding surfaces of the structural panel 050 of the invention. Composite preforms 400 may be attached to an underneath surface of top plate 101 at the areas designated by 290 using any adhesive or chemical bonding material or processes known in the art. Likewise, composite preforms 400 may be attached to an upper surface of the bottom plate 210 at the areas designated as 295 using any adhesive or chemical bonding material or processes known in the art. In this manner, a first set of composite preforms 400 may be bonded to an underneath surface of top plate 101, and likewise a second set of composite preforms 400 are bonded to a top surface of the bottom plate 210. The first set of composite preforms 400 may then be lined up with and placed upon the second set of composite preforms 400 that are bonded to a top surface of the bottom plate 210 as depicted in the figure. The first set of composite preforms 400 may then be attached to the second set of composite preforms 400 at the junctions shown as 296 in the figure using any adhesive or chemical bonding material or processes known in the art, thus creating a structural panel 050 of the invention. Open spaces 250 and preform foam cores 260 are shown for reference.

Figure 6:
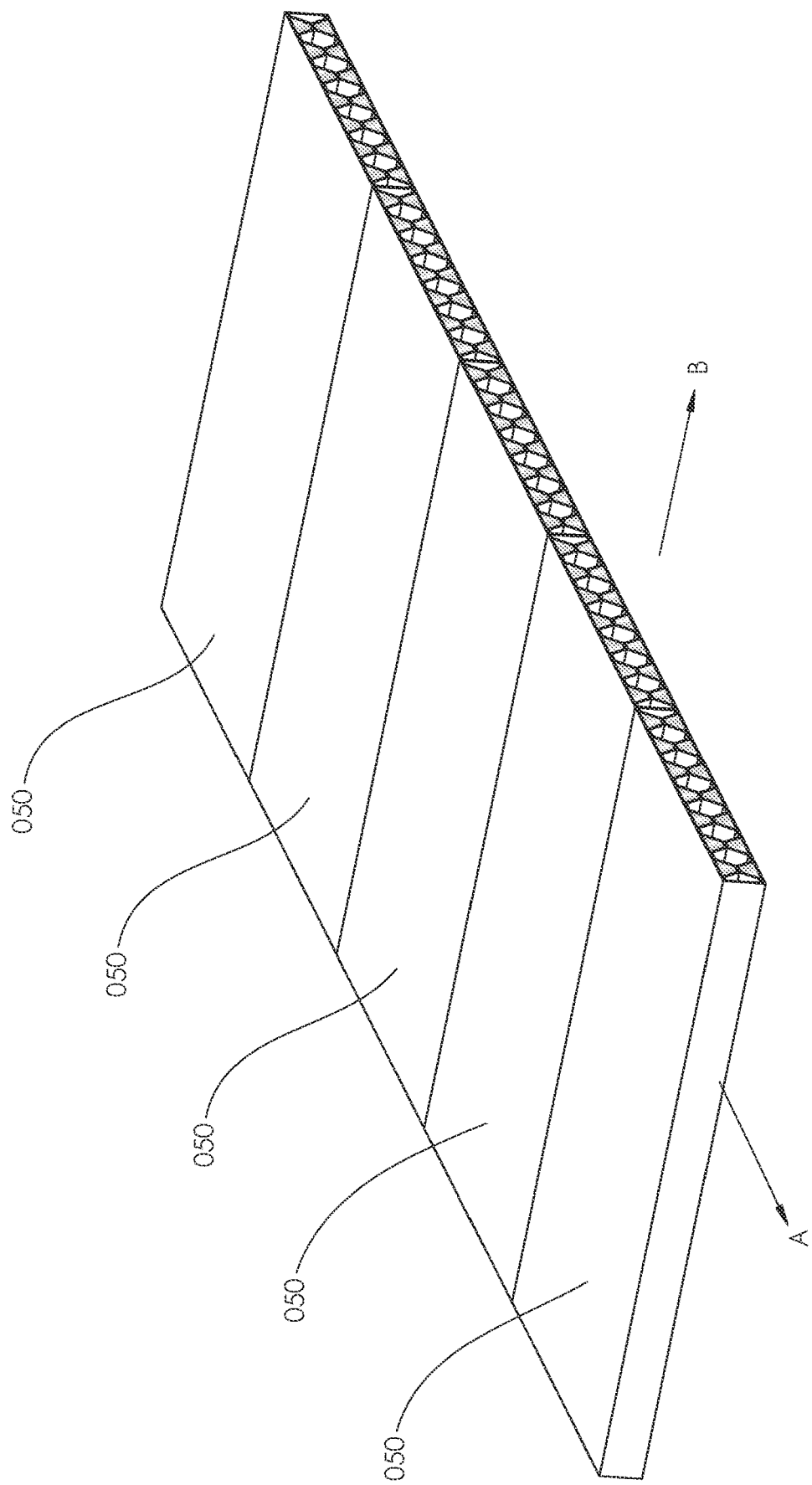
FIG. 6 depicts an assembled perspective view of a plurality of the structural panel panels of the invention in which the composite preforms are disposed transverse to the longitudinal axis of the resulting structural panel assembly, which may also be the direction of travel for vehicles upon a bridge deck comprising structural panels of the invention.

Referring now to FIG. 6 a plurality of structural panels 050 of the invention are depicted as they may be oriented, for example, in an application in which the structural panels 050 of the invention are utilized to create the decking of a bridge, causeway, ramp, trestle, or other structure. It can be seen that a plurality of structural panels of the invention 050 may be disposed such that the composite preforms comprising the structural panel 050 run in a transverse direction to the longitudinal axis A of the bridge, causeway, ramp, trestle or other structure. Orientation of the composite preforms comprising structural panel 050 as depicted in the figure are preferred, however, composite preforms of the invention may run in any direction relative to the longitudinal axis of the completed structure as may be desired by the user. It is to be understood that the orientation of the composite preforms depicted in FIG. 6 is exemplary of one of many orientations that are within the scope of the invention. Transverse direction B is a preferred direction in which the structural composite preforms 400 run.

Figure 7B:
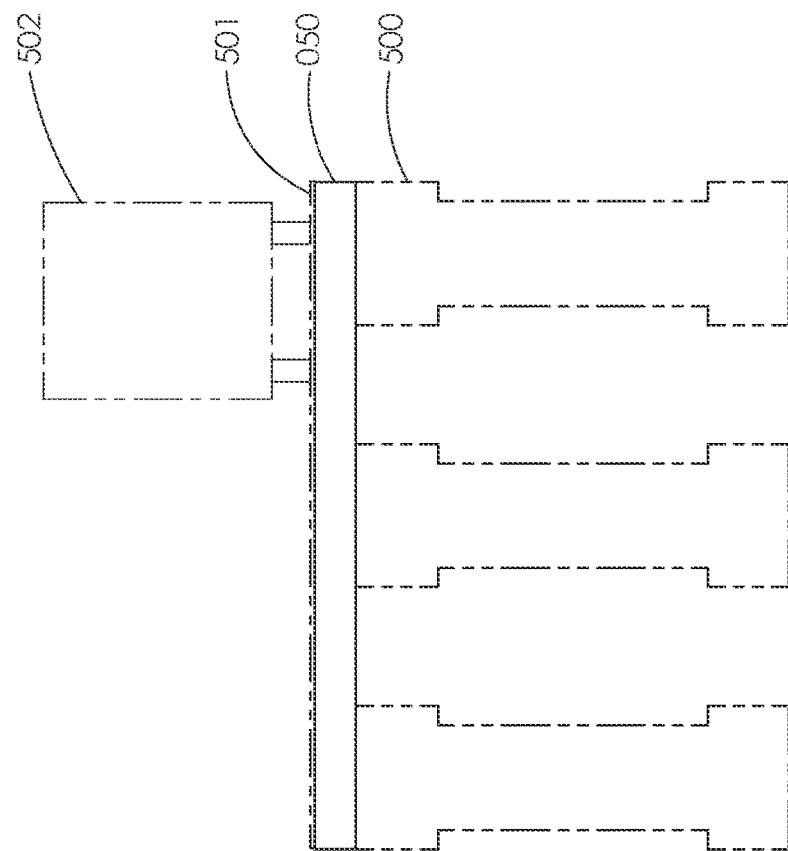
FIG. 7B depicts a cross section view of a bridge structure upon which the structural panels of the invention have been placed to form a continuous bridge deck.
Figure 7A:
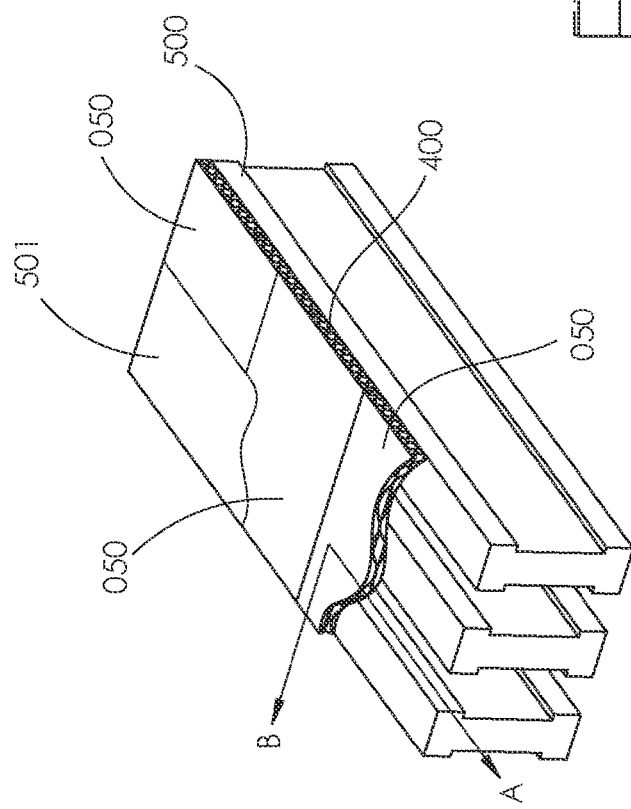
FIG. 7A depicts a perspective view of a bridge structure upon which a plurality of structural panels of the invention have been placed to form a continuous bridge deck, and showing a vehicle upon the bridge deck.

Referring now to FIGS. 7A and 7B, an example of but one of many intended uses of the composite structural panel of the invention is depicted. In the example shown, a plurality of structural panels of the invention 050 are disposed upon a series of longitudinal bridge support beams 500, which may be, for example, comprised of cement as is known in the art. The number and cross sectional shape of longitudinal bridge support beams 500 depicted in the figure are exemplary only: any number of longitudinal bridge support beams 500 may be present in any given bridge deck application, and the longitudinal bridge support beams 500 may take any cross section. Arrow A indicates the longitudinal axis of the bridge and roadway. Arrow B indicates a preferred orientation of the composite preforms 400 of the invention; i.e., transverse to the longitudinal axis A of the bridge and roadway. Thus a vehicle 502 may traverse a roadway surface 501 that is disposed on an upper surface of structural panels 050 of the invention.

Referring again to FIG. 5, the composite preforms 400 of the invention as depicted in the figures of the drawings are generally comprised of a foam core interior surrounded by an outer reinforcing fabric layer. A non-woven fabric layer, such as a mat fiber layer, may also be attached to the reinforcing fabric layer. Foam is attached to the nonwoven fabric layer on the side of the nonwoven fabric layer opposite the reinforcing fabric by filling the interstices (pores) of the fabric layer with foam and allowing the expanding foam to fill the interstitial spaces of the fabric layer. The outer reinforcing fabric layer and nonwoven fabric layer may then be saturated with resin which is subsequently allowed to cure creating a completed composite preform ready for assembly onto either a top plate or bottom plate of the invention. There are several methods suitable for fabricating composite preforms 400, but the method of the present invention comprises as a preferred method the methods for continuous fabrication of a composite preform as taught and described in U.S. Pat. No. 5,897,818 to Lewit, and also the methods taught and disclosed in U.S. Pat. No. 6,013,213, issued Jan. 11, 2000; U.S. Pat. No. 6,004,492 issued Dec. 21, 1999; U.S. Pat. No. 5,908,591 issued Jun. 1, 1999; U.S. Pat. No. 5,429,066 issued Jul. 4, 1995; U.S. Pat. No. 5,800,749 issued Sep. 1, 1998; U.S. Pat. No. 6,206,669 issued Mar. 27 2001; U.S. Pat. No. 5,664,518 issued Sep. 9, 1997; U.S. Pat. No. 6,543,469 issued Apr. 3, 2003; U.S. Pat. No. 6,497,190 issued Dec. 24, 2002; and U.S. Pat. No. 6,911,252 issued Jun. 28, 2005.

As used herein, "foam" means foams that are commonly formed using two or more component parts which are mixed together immediately prior to the time that the phone is to be used. Thus, "foam" means any foam material used in the art of composite structure manufacture, and includes, for example and not by way of limitation, polyurethane foam such as a self-expanding self-curing foam. Typically, such a self-rising, self-curing foam is a urethane foam commercially available from BASF, MOBAY, PPG and is typically an MDI-based rigid polyurethane foam (methylene-diphenyl-methane diisocyanate) using "hydrogenated chlorofluorocarbons" (HCFe), water and/or CO2 as a blowing agent. For example the foam may be a two-part, self-expanding, self-curing urethane foam in which the component parts are mixed together prior to use. Thus, "foam" includes all foams and includes, but is not limited to, the class of foams known as structural foams.

Alternatively, after the fabric layers have been applied to the foam such that the foam core is at least partially covered by, in a preferred embodiment, a nonwoven fabric layer that is in turn covered by an outer reinforcing fabric layer, the methods taught and described in U.S. Patent Publication No. US20140262011A1 may be utilized to "wet out" or saturate the fabric layers with resin in a continuous fashion, which resin may then subsequently be cured by any of the known curing means in the art, or using the continuous cure methods taught and disclosed in U.S. Patent Publication No. US20140262011A1, creating a complete composite preform ready for assembly onto either a top plate or bottom plate of the present invention. It is within the scope of the present invention that all the methods for continuously curing the saturated composite preforms taught and disclosed in U.S. Patent Publication No. US2014026201TAT may be utilized to wet out and cure the composite preforms and plates of the invention.

As used herein, unless otherwise defined, "fabric" means woven or nonwoven fabric material. Nonwoven fabric material, sometimes also referred to as knitted fabric, is preferably a material such as, for example, commercially available under the trade name Duraspun® from Johns Manville. The nonwoven layer is generally a nonwoven fabric composed of continuous thermoplastic fiber, needle punched together to yield a felt-like fabric. In addition to fabrics like Duraspun®, other material such as polyester staple mat glass fiber mat, as well as other organic and inorganic fiber mats and fabrics can be employed as the non-woven fabric material. Reinforcing fiber is preferably, but not necessarily, a woven directional reinforcing fiber layer of organic or inorganic structural reinforcing fibers such as, for example, glass fibers, carbon fibers, aramid fibers, such as those fibers available from DuPont Corporation under the trade name Kevlar®, linear polyethylene or polypropylene fibers such as is commercially available from AlliedSignal Incorporated under the trade name Spectra®, or polyester fibers. It should be understood that the phrase "reinforcing fiber" is meant to include any fiber which, when added to a composite material, enhances the structural properties of the material. The fibers can be randomly oriented, or preferentially, they can be oriented in one or more directions. While a number of specific types of materials have been given for use as the reinforcing fiber layer, it will be appreciated by those of ordinary skill in the art that other equivalent type reinforcing fiber layers can be employed in the practice of the invention.

As used herein, unless otherwise defined, "resin" means any matrix or other material that is used to coat or saturate the fabric layers of a fiber-reinforced composite structure or preform. Such resins include but are not limited to polymers (orthophthalic, isophthalic or otherwise), polyester resins, vinyl ester resins, epoxy resins, phenolic and any other resin known in the art of composite structure manufacture. As used herein, "resin" or "resins" also includes any resin that is cured or polymerized by application of chemical accelerants or catalysts, light (regardless of wavelength), heat, electron beam cure that may utilize, for example, high energy electrons or X rays such as ionizing radiation, or any other type of cure process or materials known in the art. Light cure, as used herein, also means "light-activated", and includes all light curable resins including but not limited to one-part translucent polymers that cure when exposed to a specific light spectrum. When the word "light" is used herein, it refers to light energy of an optical spectrum that is matched to the light curable resin it is being used to cure. "Cure on demand" resins mean any resin that does not self-cure: typically cure on demand resins are cured by application of some external energy such as heat, light, ionizing radiation or any other energy source.

As used herein, "cure" and "cured" means any method for curing resins known to persons of reasonable skill in the art such as heat cure, time cure, light cure, chemical cure and all other methods for curing resins. "Cure" and "cured" also means all methods for curing taught and disclosed in United States Patent Application Publication No. US20140262011A1, published on Sep. 18, 2014 and also includes all methods for co curing taught and disclosed in United States Patent Application Publication No. US20140199551, CO-CURED GEL COATS, ELASTOMERIC COATINGS, STRUCTURAL LAYERS, AND IN-MOLD PROCESSES FOR THEIR USE.

As referred to herein, a "unidirectional warp fabric" is a woven fabric in which the majority of fibers run in one direction, which is the direction, or warp, of the roll upon which the fabric is disposed prior to use.

Manufacturing the Composite Preforms 400

One method, although not preferred, for manufacturing the composite preforms of the invention is to use the traditional mold construction technique. Elongated molds of desirable cross section, such as trapezoidal, rectangular, triangular, square or any other cross sectional shape desired, which can be lined with fabric layers as described above, may be provided. The molds are then injected with foam which has been formed by mixing the proper ratio of constituent parts. The component foam parts typically comprise a blowing agent which is combined with a resin. After these steps, the outer reinforcing fabric layer and nonwoven fabric layer may then be saturated with resin which is subsequently allowed to cure, creating a composite preformed which may then be cut to length. The composite preform is then ready for assembly onto either a top plate or bottom plate of the invention as described elsewhere herein. In this manner, the structural preforms of the invention may be fabricated. However, this is not a preferred technique for fabrication of the structural preforms of the invention because this method the fabrication of composite preforms is time-consuming and does not lend itself to rapid production rates such as are required in an efficient assembly line.

A preferred method for continuously fabricating the composite preforms of the invention is the process described in detail in U.S. Pat. No. 5,897,818 to Lewit (the "818 patent). Generally, a conveyor system, roller-fed fabric or fabrics, and a forming die are used to assemble the composite preform as taught and described in the '818 patent. An upper fabric guide is provided to aid in smoothing the fabric web and properly positioning same as it passes into of the forming die. Foam is injected into, or slightly before, the forming die. The foam expands into interstitial spaces in the fabric layer closest to the foam as the fabric layers are fed through the forming die, such that a composite preform exits the exit side of the forming die that is covered at least partially in one or more fabric layers, the innermost of this is attached to the expanded foam forming the foam core of the composite preform. The composite preform may then be cut to length as described in the '818 patent, or may be cut by any other means including by hand. The final, cut-to-length composite preform may then be saturated with resin, which may then be subsequently cured, by any method known in the art, including the methods of wetting out, or saturating the fabric layer or layers of the composite preform, and curing out taught and disclosed in U.S. Patent Application Publication No. US20140262011A1.

Referring now to FIG. 8, the composite preforms comprising the invention may comprise any foam, any fabric, any number of layers of fabric, and any orientation of fibers as may be desired by a user. A presently preferred embodiment of the composite preforms of the invention may be, but is not necessarily, produced by the process described in detail in the '818 patent, is depicted in FIG. 8. Included within the scope of the method of the present invention are all methods for continuously manufacturing a composite preform taught and disclosed in the '818 patent. In a preferred embodiment of the structural panel of the invention, composite preform foam core 260 is surrounded by non-woven mat fabric 261, which may be a polyester felt mat, which in turn may be surrounded by a 24 ounce per square yard fabric layer 262 comprising fiber layers oriented in an +45 and −45 degree orientation as related to longitudinal axis B of the composite preform 400.

Manufacturing the Top Plate 101 and Bottom Plate 210 of the Invention

The top plate depicted as item 101 in the figures of the drawings, and the bottom plate, depicted as item 210 in the figures of the drawings, may each be fabricated by using manufacturing processes known in the art for fabricating laminated plates comprised of at least one, but preferably a plurality, of fabric layers that have been impregnated with resin which is subsequently cured.

Preferably, but not necessarily, the fabric layers comprising top plate 101 and bottom plate 210 may be defined as a combination of layers of fabric, in which multiple combined layers comprising a layer of woven fabric such as, for example, 18 ounce per square yard warp unidirectional E-glass stitched to a layer 1.0 ounces per square foot chopped strand mat ("CSM") fabric. The CSM fabric provides an inter-layer spacing between the layers of warp unidirectional glass. This spacing creates a separation between the layers of warp unidirectional glass which serves to reduce shear strain forces developed in the layers of warp unidirectional glass when a plate of the invention is subjected to forces such as a bending force. This advantage of the invention over the prior art is depicted in FIGS. 14A and 14B. Referring now to FIG. 14A, a plate of the prior art constructed of two layers of woven fabric which have been impregnated with a resin which is subsequently cured is depicted. A first woven layer I is thus connected to a second woven layer J by the resin between them L. When a prior art plate constructed thusly experiences forces causing it to bend as shown in FIG. 14A, shear strain develop in the resin layer L which is the attachment between layers I and J. Typically, such plates are constructed by overlaying fabric layers I and J, and then impregnating them with resin simultaneously during a wet out process, which is then followed by a resin curing process. Since layers I and J are overlaid, the distance M1 between them may be very small. This can lead to extremely high shear stress or strain values in the connecting resin layer L, which will cause failure in the resin layer L and eventually will propagate when the plate is subjected to further or continued bending loads, causing structural failure of the plate.

In contrast to the prior art panel shown in FIG. 14A, one embodiment of the plates of the invention in which woven fabric layers I and J are separated by an interposing layer of non-woven fabric K as depicted in FIG. 14B. The non-woven fabric layer K, which may be the non-woven layer 261 of FIG. 9, may be stitched to the woven fabric layers I and J which may be the woven fabric layers 270 of FIG. 9. The non-woven fabric layer K serves to increase the separation between woven layers I and J. Thus, when a plate of the invention is subjected to the same bending forces as the example of FIG. 14A, the magnitude of the shear stress or strain developed in resin layers L1 and L2 is substantially less than the shear stress or strain developed in resin layer L in the example of FIG. 14A. This means that an embodiment of the invention which comprises one or more combined layers as depicted in FIG. 14B will experience less shear stress or strain in its resin layers than plates of the prior art, and will be able sustain greater applied force than plates of the prior art. Thus the layer stack sequence depicted in FIG. 14B and further in FIG. 9 is optimized on both a local and global level for reducing shear strain in the composite structure.

Figure 9:
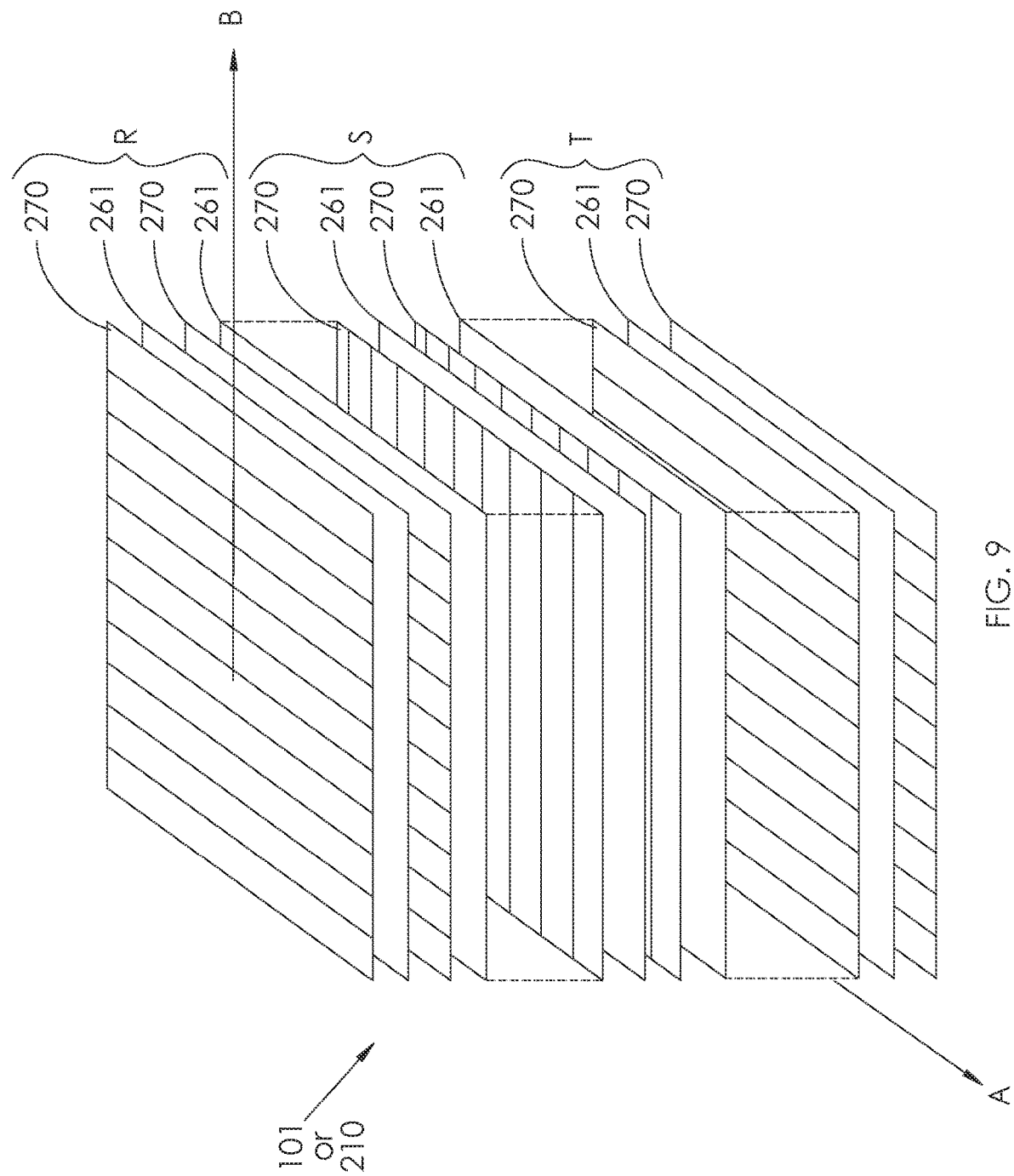
FIG. 9 depicts a perspective view of an exemplary fabric layer stack-up comprising the top and bottom plates of the structural panel of the invention.

Referring now to FIG. 9, an exemplary preferred embodiment of each of top plate 101 and bottom plate 210 is depicted in which the various fabric layers are described. A preferred embodiment of top plate 101 may comprise a plurality of groups of fabric layers, each group comprising at least one but preferably a plurality of woven fabric layers in the group having their unidirectional fibers running in a similar direction and each woven fabric layer in the group separated by a non-woven fabric layer, and each successive fabric layer group having the woven fabric layers unidirectional fibers running at 900 to the unidirectional fibers in the woven fabric layers of the adjacent groups. Thus, a first group R of fabric layers may comprise woven fabric layers 270 separated by non-woven fabric layers 261 and arranged such that the direction of their unidirectional fibers is along the axis indicated by arrow A; followed by a second group S of fabric layers comprising woven fabric layers 270 separated by non-woven fabric layers 261 and arranged such that their unidirectional fibers are oriented along the axis indicated by arrow B which may be transverse to, or oriented at 900 to, direction A; followed by a third group T of woven fabric layers 270 separated by non-woven fabric layers 261 and disposed such that their unidirectional fibers are oriented along the axis indicated by arrow A, and so on. This alternating pattern of groups of fabric layers comprising woven fabric layers 270 separated by non-woven fabric layers 261 and arranged such that their unidirectional fibers are oriented in either the direction of A or B, with each group alternating the direction of their unidirectional fibers, may be comprised of any number of woven fabric layers 270 per group, each woven fabric layer 270 separated by a non-woven layer 261, and the plates of the invention may comprise any number of groups. It is not necessary that the top and bottom plates of the invention comprise the same number of fabric layers, fabric groups, or fabric layers per group. In a preferred embodiment of top plate 101, each woven fabric layer 270 may comprise any fabric weight but is preferably 18 ounce per square yard warp unidirectional E-glass and may be separated by a non-woven, or chopped stranded mat, fabric layer 261 comprising any fabric weight but is preferably 9.0 ounces per square yard (or 1 ounce per square foot). The fabric layers may be stitched together. The assembly of fabric layers comprising the top and bottom plates is then saturated with a resin which is subsequently cured to form a preferred embodiment of top plate 101 or bottom plate 210 of the invention. Although this is the preferred embodiment for the fabric elements comprising top plate 101 and bottom plate 210, any other combination or orientation of fabrics may comprise the top and bottom plates of the invention. However, the specific fabrics identified herein provide for maximum continuity of the unidirectional fibers, while the mat layers control the fiber content to maximize fatigue performance under the dynamic traffic load as may be expected in many structural applications including but not limited to bridge decking applications. These preferred exemplary embodiments of top plate 101 and bottom plate 210 typically result in a top plate 101 thickness of between 9/16 inches and 3/4 inches, and a bottom plate 210 thickness of between 3/8 inches and 1/2 inch; however, any number of fabric layers may comprise the top plate 101 and bottom plate 210 layers, and thus the thickness of top plate 101 and bottom plate 210 by be determined by the numbers of fabric layers chosen by the user to fabricate these structural members and are therefore variable as desired by the use. The layers of fabric may be stitched together.

Top plate 101 and bottom plate 210, depicted as rectangular in the figures of the drawings, may take any outline or shape desired and may be any cross-sectional thickness desired as may be required by the particular application for which the structural panel is intended to be used. In the exemplary embodiments described herein, top plate 101 and bottom plate 210 are shown to be rectangular in shape. However, it is to be understood that these are exemplary depictions only and that top plate 101 and bottom plate 210 may take any shape, or be any cross-sectional thickness as may be required by a specific application of the structural panel of the invention.

Figure 13A:
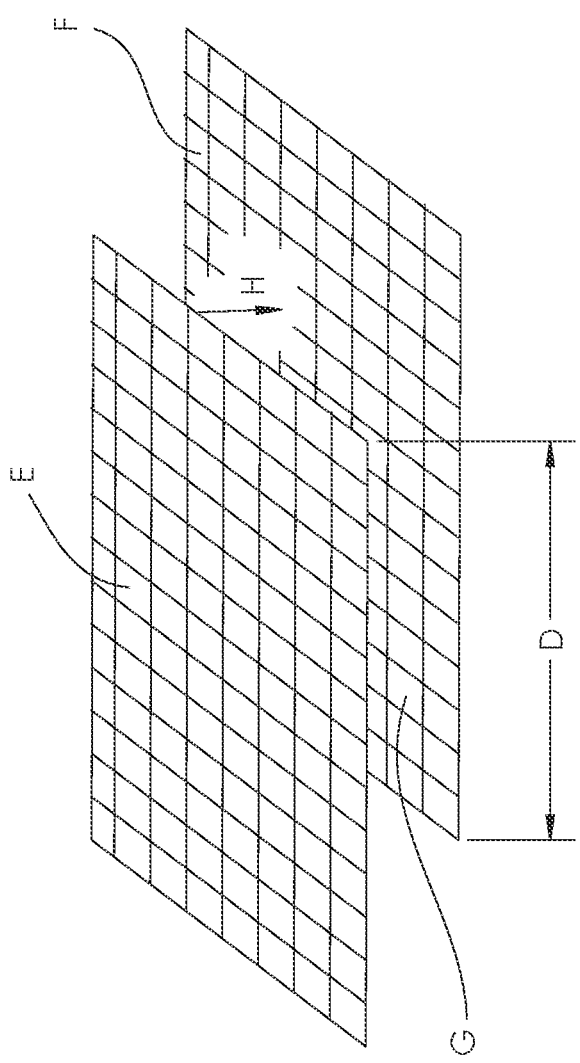
FIGS. 13A and 13B depict an overlap fabric joint of the prior art in which tow ends are overlapped and wetted with resin to form a structure. These figures are for the purpose of explaining some of the advantages of the method and apparatus of the invention.
Figure 13B:
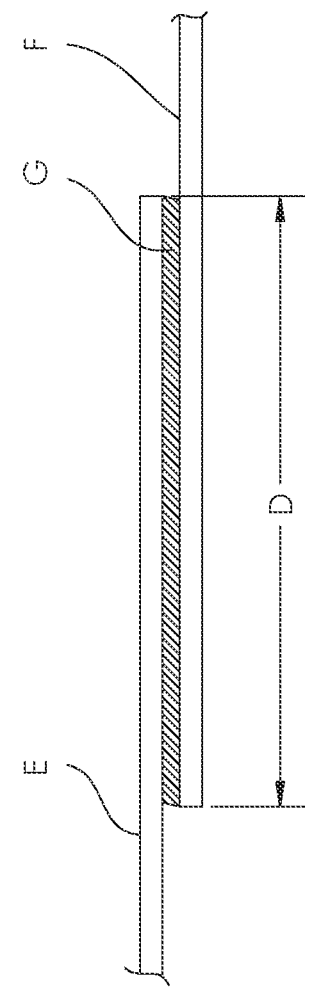

While woven fabric layers 270 may be any fabric, they are preferably, but not necessarily, comprised of unidirectional warp fabric layers oriented with their unidirectional fibers running as shown in FIG. 9. These woven fabric layers 270 are preferably comprised of a continuous fabric layer, or, other words, there are no overlapping joints as depicted in FIGS. 13A and 13B in in which two pieces of fabric are joined to create a single layer 270. Such overlapping joints, which may be created by overlaying a first fabric layer E onto a second fabric layer F by placing fabric layer E onto fabric layer F in the direction of arrow H and then wetting the Joint with resin, followed by curing the resin, are sometimes used in the prior art to attach fabric to a structure, and are weak points in the structure due to the discontinuity of fibers across the joint area D. In such construction using overlapping joints, the resin G between fabric layer E and F must carry all loads applied to the structure because of the discontinuity of the fibers at the joint. Preferred embodiments of the invention have no such overlapping joints in any layer; the preferred embodiments of the invention avoid overlapping joints by utilizing continuous runs of fabric in the buildup of the layers.

Assembling the Structural Panel Top Half 100 and Bottom Half 200

Figure 10:
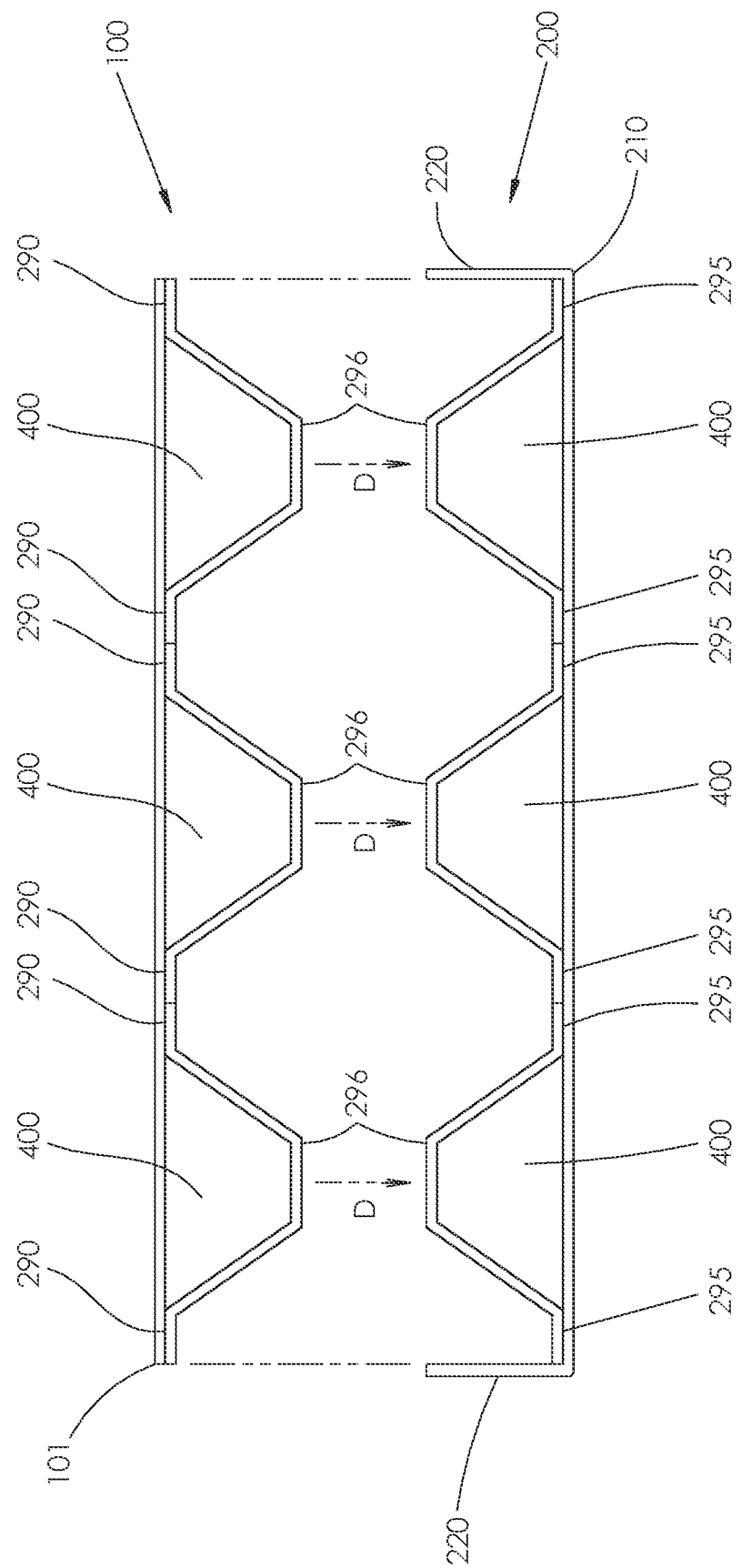
FIG. 10 depicts a cross section view of an exemplary structural panel of the invention as being assembled from a top half and a bottom half, wherein the top half comprises a top plate attached to at least one but preferably a plurality of composite preforms, and wherein the bottom half comprises a bottom plate attached to at least one but preferably a plurality of composite preforms, and wherein the composite preforms of the top half are bonded to the composite preforms of the bottom half, forming an exemplary structural panel of the invention.

Referring now to FIG. 10 an exemplary method and assembly procedure for assembling the structural panel top half and structural panel bottom half are now described.

Still referring to FIG. 10, top plate 101 may be oriented as shown and a plurality of composite preforms 400 may be placed in contact with an underneath surface of top plate 101 as shown in FIG. 10. Structural composite preforms 400 may be bonded to the underneath surface of top plate 101 in the areas depicted as 290 in FIG. 10. Each of the composite preforms 400 may be attached to the underneath surface of top plate 101 by any means known in the art but preferably are adhesively or chemically bonded using any known adhesive or chemical bonding agent known in the structural composites arts. Additionally, composite preforms 400 may be attached to the underneath surface of top plate 101 by adding fabric layers placed over composite preforms 400 such that they overlay composite preforms 400 and also overlay a portion of the underneath surface of top plate 101 on each side of each composite preform 400, saturating said fabric layers with resin, and subsequently curing the resin. Such fabric layers, once saturated and cured, serve to not only bond the composite preforms 400 to the underneath surface of top plate 101 but also serve to strengthen structural panel top half 100. Any number of fabric layers may be utilized for the attachment of composite preforms 400 to the underneath surface of top plate 101. In this manner, structural panel top half 100 is fabricated in this exemplary but preferred embodiment of the method of the invention. Any suitable series of steps resulting in the attachment of composite preforms 400 to the underneath surface of top plate 101 described herein may be utilized in the method of the invention. It is to be understood that the specific method and series of steps described herein is exemplary of just one of many embodiments of the method of the invention.

Still referring to FIG. 10, bottom plate 210 may be oriented as shown and a plurality of composite preforms 400 may be placed in contact with and on top of an upper surface of bottom plate 210 as shown in FIG. 10. Structural composite preforms 400 may then be bonded to the upper surface of top plate 101 in the area respected as 295 in FIG. 10 each of the composite preforms 400 may be attached to the upper surface of the bottom plate 210 by any means known in the art but preferably are adhesively or chemically bonded using any known adhesive or chemical bonding agent known in the structural composites arts. Additionally, composite preforms 400 may be attached to the upper surface of bottom plate 210 by adding fabric layers placed over composite preforms 400 such that they overlay composite preforms 400 and also overlay a portion of the upper surface of bottom plate 210 on each side of each composite preform 400, saturating said fabric layers with resin, and subsequently curing the resin. Such fabric layers, once saturated and cured, serve to not only bond the composite preforms 400 to the underneath surface of bottom plate 210 but also serve to strengthen structural panel bottom half 200. Any number of fabric layers may be utilized for the attachment of composite preforms 400 to the upper surface of bottom plate 210. In this manner, structural panel bottom half 200 is fabricated in this exemplary but preferred embodiment of the method of the invention. Any suitable series of steps resulting in the attachment of composite preforms 400 to the upper surface of bottom plate 210 may be utilized in the method of the invention. It is to be understood that the specific method and series of steps described herein is exemplary of just one of many embodiments of the method of the invention.

Assembling the Structural Panel of the Invention

Still referring to FIG. 10, structural panel top 100 and structural panel bottom half 200 may be assembled together in the following manner to form the structural composite panel of the invention. Structural panel top 100 may be placed upon structural panel bottom half 200 as depicted by the direction lines D in FIG. 10, forming a bonding joint 296 between surfaces of the composite preforms of the structural composite panel top half 100 and the composite preforms of structural composite panel bottom half 200. Structural composite panel top half 100 and structural composite panel bottom half 200 may be attached together using any chemical bonding agent or adhesive known in the structural composite arts to form a completed structural composite panel of the invention as is shown in cross-section in FIG. 5 and an perspective view in FIGS. 1 and 4. It should be noted that structural panel bottom half side plates 220 are optional and may be present in an alternate embodiment of the invention. Thus the structural panel of the invention in various alternate embodiments may, or may not, comprise side plates 220.

It is to be understood that the application of curable resin(s) and other coatings, such as gel coat, may be accomplished in any order or sequence and may be subsequently cured using any process known in the art. For example, the invention comprises the methods and processes for co-curing resins, gel coats and other materials taught and described in United States Patent Application Publication No. US20140199551, CO-CURED GEL COATS, ELASTOMERIC COATINGS, STRUCTURAL LAYERS, AND IN-MOLD PROCESSES FOR THEIR USE, published Jul. 17, 2014. The co-curing methods taught in this U.S. pre-grant patent publication provide toughness, flexibility, chip and crack resistance without sacrificing good adhesion to structural layers of resin-saturated fabrics.

Fabrication and Assembly of a Non-Planar Structural Panel Embodiment

Referring now to FIGS. 11A and 11B, an alternate embodiment of the invention is depicted. In this embodiment, a support structure 600 having a desired surface shape 601 may be used to shape pre-cured elements of the structural panel 050 such as plates 101 or 102, or composite preforms 400, such that they take a desired shape, which may be any shape. The uncured elements, which are pliable and flexible to a degree, may be placed over and drawn down onto surface 601 using methods known in the art such as vacuum bagging. The elements of the structural panel 050 such as plates 101 or 102, or composite preforms 400, may be wetted with resin and cured using any process known in the art, thus them to take on the desired shape 601 which may be any shape desired by a user but is shown as curved surface for illustrative purposes in FIGS. 11A and 11B. The resulting shaped elements may then be assembled together chemically bonded together to form a structural panel of the invention that has a desired shape as depicted in FIGS. 12A and 12B.

Referring now to FIGS. 12A and 12B, plates 101 or 102, and composite preforms 400, which have been formed over support structure 600 (not shown in FIGS. 12A and 12B, but shown in FIGS. 11A and 11B) so that they comprise the desired shape 601 are motivated together in the direction of arrow A where they may be chemically bonded together to form a completed panel having a desired shape 601. In this manner, curved or shaped panels of invention may be manufactured by pre-shaping the elements of the structural panels and assembling them together to form a structural panel of the invention comprising a desired shape. Such curved embodiments of the structural panel of the invention may be used to form crowned roadways which shed water as may be required for vehicles to safely traverse a bridge or other roadway structure, or may be used to form roof panels, coverings for walkways, and the like.

Figure 15:
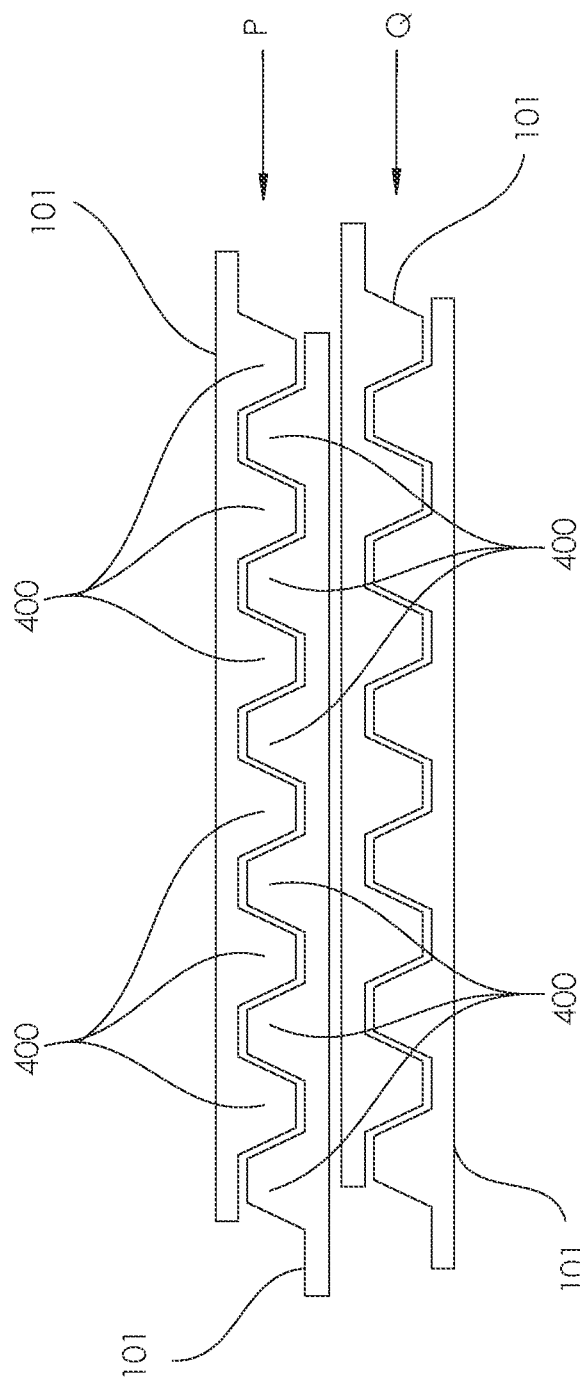
FIG. 15 depicts the ability for structural panel halves of the invention to be nested by receiving complementary surfaces for shipping so that shipping volume required for the structural panel halves is significantly minimized, leading to reduced shipping costs.

Referring now to FIG. 15, a first and second nested set of structural panel top halves, P and Q, are depicted, in which the complimentary surfaces created by the structural composite preforms 400 are of such dimension so as to allow a first structural panel top half 101 and a second structural panel top half 101 to nest together as shown. The preforms 400 comprising the top plate and the preforms 400 comprising the bottom plate may form complimentary surfaces such that a top plate may nest within a bottom plate when a top plate is inverted and motivated onto a bottom plate. Thus, the complimentary surfaces of the structural panel halves allow for nesting of panel halves during shipment, reducing shipping volume and therefore also reducing shipping costs. In this embodiment, structural panel halves may efficiently be shipped to a construction site, such bridge, building, or other construction site, and assembled in place using, for example, chemical bonding. In this manner, the shipping volume required may be fifty percent (50%) the shipping volume of a structural panel that does not comprise complimentary surfaces, which allows significant cost and time savings for construction of bridges, buildings and other structures.

The composite preforms 400 of the invention need not be of uniform height or width, which is to say their cross sectional dimensions may vary along their length.

Figure 16:
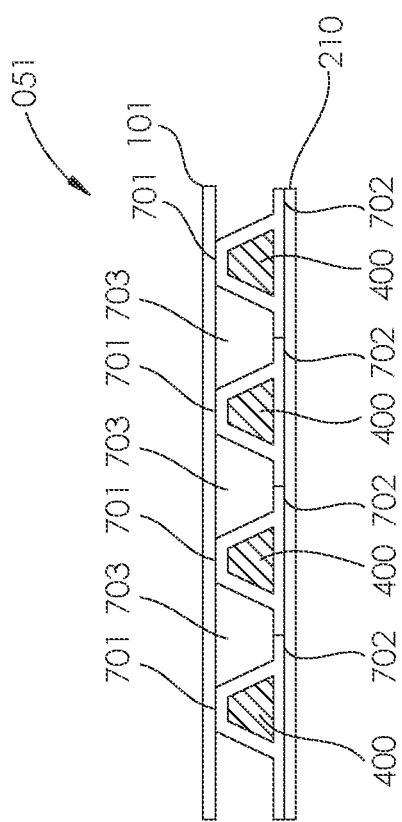
FIG. 16 depicts an alternate embodiment of the structural panel of the invention having only one row of composite preforms.

Referring now to FIG. 16, a further alternate embodiment of the structural panel 051 of the invention is depicted. One or more, and preferably a plurality, of composite preforms 400 may be attached to an upper surface of bottom plate 210 at attachment surfaces 702, which may be large bases of trapezoidally shaped preforms, by any means known in the art but preferably by chemical bonding. Likewise, composite preforms 400 may be attached to an underneath surface of top plate 210 at attachment surfaces 701, which may be small bases of trapezoidally shaped preforms, by any means known in the art but preferably by chemical bonding. Open spaces 703 run between composite preforms 400 and provide for easy inspection of the interior spaces of the structural panels by any means known in the art for inspection of structures such as visual inspection using fiber optic scopes and the like.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

INDUSTRIAL APPLICABILITY

A composite structural panel and method of fabricating and manufacturing same comprises a top panel and a bottom panel separated by and attached to at least one, but preferably a plurality, of structural composite preforms which may be fabricated by a continuous manufacturing process and may be saturated by resin using a continuous wetting process. The composite preforms may take any cross sectional shape but are preferably trapezoidal. The top and bottom panels may be fabricated from a plurality of layers of woven fabric layers and non-woven fabric layers which are saturated with a resin that is subsequently cured using cure processes known in the art.

The composite structural panel of the invention is usable as a flat structural member for use as bridge decking, ramps, trestles, roof structures, floor structures, wall structures, and any application requiring a structural panel, or, in alternative embodiments, may be fabricated and assembled in any desired shape, such as a curved shape, as may be required for a particular structural application. Thus, curved embodiments of the structural panel of the invention may be used to form crowned roadways which shed water as may be required for vehicles to safely traverse a bridge or other roadway structure, or may be used to form roof panels, coverings for walkways, and the like.

Cabling, piping, conduit, and the like may traverse the structure through open spaces in the panels of the invention as desired by the user. Furthermore, the open spaces of the invention may be used for optical and other inspection after manufacturing or after installation of the structural panels of the invention. This ability to inspect the interior of the installed structural panel of the invention is a significant advancement in the state of the art, as it is generally impossible to inspect the interior of the typical structural panels of the prior art, which may be fabricated, for example, from cement.

The complimentary surfaces of the structural panel halves allow for nesting of panel halves during shipment, thus reducing shipping volume and therefore also reducing shipping costs. In this embodiment, structural panel halves may efficiently be shipped to a construction site, such bridge, building, or other construction site, and assembled in place using, for example, chemical bonding.

The composite preforms comprising the invention may be manufactured by continuous manufacturing processes, enabling rapid manufacturing, reducing lead time for production of panels, and allows for common cross sections of preforms to be pre-fabricated for use in manufacturing structural composite panels of the invention.

The structural composite panels of the invention enable the fabrication of structures are not susceptible to corrosion, rust or other degradation suffered by metals structures, and further are not susceptible to the degrading effects of galvanic corrosion. The preferred embodiments of the structural composite panels of the invention contain no metallic components.

What is claimed is:

1. A structural composite panel, comprising:
    a top plate having an upper surface and an underneath surface, wherein said top plate is comprised of a plurality of fiber layers saturated with resin and subsequently cured;
    a bottom plate having an upper surface and a lower surface wherein said bottom plate is comprised of a plurality of fiber layers saturated with resin and subsequently cured;
    a first set of at least one composite preforms having a core comprised of expanding foam, each composite preform covered in a fabric wherein said expanding foam has expanded into interstitial spaces in said fabric, and wherein said fabric has been saturated with resin which has been subsequently cured;
    a second set of at least one composite preforms having a core comprised of expanding foam, each composite preform covered in a fabric wherein said expanding foam has expanded into interstitial spaces in said fabric, and wherein said fabric has been saturated with resin which has been subsequently cured;
    wherein said first set of composite preforms are attached to said underneath surface of said top plate; and
    wherein said second set of composite preforms are attached to said upper surface of said bottom plate; and
    wherein said first set of composite preforms and said second set of composite preforms are attached together forming a structural composite panel.

2. The structural composite panel of claim 1, wherein said bottom plate is further defined as having a rectangular or square shape having four edges, wherein two opposing edges further comprise a side plate extending from said bottom plate towards said top plate, and wherein said side plate is of a height that is substantially equal to the thickness of the combination of said top plate, said composite preforms attached to said top plate, said bottom plate, and said composite preforms attached to said bottom plate.

3. The structural composite panel of claim 1, wherein said preforms comprising said top plate and said preforms comprising said bottom plate form complimentary surfaces such that a top plate may nest within a bottom plate when a top plate is inverted and motivated onto a bottom plate.

4. The structural composite panel of claim 1, wherein each composite preform of said first set of composite preforms and each composite preform of said second set of composite preforms are trapezoidal in cross section, and
    wherein said attachment of said first set of composite preforms to said underneath surface of said top plate occurs at a large base of said trapezoids;
    and wherein said attachment of said second set of composite preforms to said upper surface of said bottom plate occurs at a large base of said trapezoids;
    and wherein said attachment of said first set of composite preforms and said second set of composite preforms occurs at a small base of said trapezoids.

5. The structural composite panel of claim 4, wherein said bottom plate is further defined as having a rectangular or square shape having four edges, wherein two opposing edges further comprise a side plate extending from said bottom plate towards said top plate, and wherein said side plate is of a height that is substantially equal to the thickness of the combination of said top plate, said composite preforms attached to said top plate, said bottom plate, and said composite preforms attached to said bottom plate.

6. The structural composite panel of claim 4, wherein said preforms comprising said top plate and said preforms comprising said bottom plate form complimentary surfaces such that a top plate may nest within a bottom plate when a top plate is inverted and motivated onto a bottom plate.

7. The structural composite panel of claim 4, wherein said plurality of fabric layers comprising said top plate and said bottom plate are further defined as being characterized as having a first group of fabric layers, second group of fabric layers, and third group of fabric layers wherein said first group of fabric layers comprises a plurality of woven fiber layers separated by non-woven fabric layers and having longitudinal fibers aligned in a first direction; wherein said second group of fabric layers comprises a plurality of woven fiber layers separated by non-woven fabric layers and having longitudinal fibers aligned in a second direction that is transvers to said first direction; wherein third group of fabric layers comprises a plurality of woven fiber layers separated by non-woven fabric layers and having longitudinal fibers aligned in said first direction.

8. The structural composite panel of claim 7, wherein said top and bottom plate woven fabric layers is further defined as 18 ounces per square yard warp unidirectional glass fabric and wherein said non-woven layers comprise nine ounce per square yard non-woven fabric.

9. The structural composite panel of claim 4, wherein said at least one composite preform is further defined as a plurality of composite preforms.

10. The structural composite panel of claim 9, wherein said plurality of fabric layers comprising said top plate and said bottom plate are further defined as being characterized as having a first group of fabric layers, second group of fabric layers, and third group of fabric layers wherein said first group of fabric layers comprises a plurality of woven fiber layers separated by non-woven fabric layers and having longitudinal fibers aligned in a first direction; wherein said second group of fabric layers comprises a plurality of woven fiber layers separated by non-woven fabric layers and having longitudinal fibers aligned in a second direction that is transvers to said first direction; wherein third group of fabric layers comprises a plurality of woven fiber layers separated by non-woven fabric layers and having longitudinal fibers aligned in said first direction.

11. The structural composite panel of claim 10, wherein said top and bottom plate woven fabric layers is further defined as 18 ounces per square yard warp unidirectional glass fabric and wherein said non-woven layers comprise nine ounce per square yard non-woven fabric.

12. The structural composite panel of claim 1, wherein said at least one composite preform is further defined as a plurality of composite preforms.

13. The structural composite panel of claim 12, wherein said plurality of composite preforms comprising the first set of composite preforms is the same number as said plurality of composite preforms comprising the second set of composite preforms.

14. The structural composite panel of claim 13, wherein said plurality of fabric layers comprising said top plate and said bottom plate are further defined as being characterized as having a first group of fabric layers, second group of fabric layers, and third group of fabric layers wherein said first group of fabric layers comprises a plurality of woven fiber layers separated by non-woven fabric layers and having longitudinal fibers aligned in a first direction; wherein said second group of fabric layers comprises a plurality of woven fiber layers separated by non-woven fabric layers and having longitudinal fibers aligned in a second direction that is transvers to said first direction; wherein third group of fabric layers comprises a plurality of woven fiber layers separated by non-woven fabric layers and having longitudinal fibers aligned in said first direction.

15. The structural composite panel of claim 12, wherein said plurality of fabric layers comprising said top plate and said bottom plate are further defined as being characterized as having a first group of fabric layers, second group of fabric layers, and third group of fabric layers wherein said first group of fabric layers comprises a plurality of woven fiber layers separated by non-woven fabric layers and having longitudinal fibers aligned in a first direction; wherein said second group of fabric layers comprises a plurality of woven fiber layers separated by non-woven fabric layers and having longitudinal fibers aligned in a second direction that is transvers to said first direction; wherein third group of fabric layers comprises a plurality of woven fiber layers separated by non-woven fabric layers and having longitudinal fibers aligned in said first direction.

16. The structural composite panel of claim 15, wherein said top and bottom plate woven fabric layers is further defined as 18 ounces per square yard warp unidirectional glass fabric and wherein said non-woven layers comprise nine ounce per square yard non-woven fabric.

17. The structural composite panel of claim 1, wherein said plurality of fabric layers comprising said top plate and said bottom plate are further defined as being characterized as having a first group of fabric layers, second group of fabric layers, and third group of fabric layers wherein said first group of fabric layers comprises a plurality of woven fiber layers separated by non-woven fabric layers and having longitudinal fibers aligned in a first direction; wherein said second group of fabric layers comprises a plurality of woven fiber layers separated by non-woven fabric layers and having longitudinal fibers aligned in a second direction that is transverse to said first direction; wherein third group of fabric layers comprises a plurality of woven fiber layers separated by non-woven fabric layers and having longitudinal fibers aligned in said first direction.

18. The structural composite panel of claim 17, wherein said top and bottom plate woven fabric layers is further defined as 18 ounces per square yard warp unidirectional glass fabric and wherein said non-woven layers comprise nine ounce per square yard non-woven fabric.

* * * * *